United States Patent
Kim et al.

(10) Patent No.: US 12,493,665 B2
(45) Date of Patent: Dec. 9, 2025

(54) DEVICE AND METHOD FOR OPERATION OF DATA

(71) Applicant: REBELLIONS INC., Seongnam-si (KR)

(72) Inventors: Jinseok Kim, Seongnam-si (KR); Jinwook Oh, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 19/182,479

(22) Filed: Apr. 17, 2025

(65) Prior Publication Data

US 2025/0348552 A1 Nov. 13, 2025

(30) Foreign Application Priority Data

May 7, 2024 (KR) ........................ 10-2024-0059873

(51) Int. Cl.
*G06F 17/16* (2006.01)

(52) U.S. Cl.
CPC .................................. *G06F 17/16* (2013.01)

(58) Field of Classification Search
CPC .......... G06F 17/153; G06F 17/16; G06F 7/76; G06F 7/764; G06F 9/3001; G06F 9/30043; G06F 9/30038; G06N 3/04; G06N 3/0464; G06N 3/0495; G06N 3/063

See application file for complete search history.

(56) References Cited

U.S. PATENT DOCUMENTS

| | | | |
|---|---|---|---|
| 10,565,207 B2 | 2/2020 | Huang | |
| 2019/0278600 A1 | 9/2019 | Frumkin et al. | |
| 2020/0334038 A1 | 10/2020 | Anders et al. | |
| 2021/0326144 A1* | 10/2021 | Raha | G06N 3/045 |
| 2024/0161227 A1* | 5/2024 | Appu | G06F 9/3887 |

* cited by examiner

*Primary Examiner* — Emily E Larocque
(74) *Attorney, Agent, or Firm* — BROADVIEW IP LAW, PC

(57) ABSTRACT

The present disclosure relates to a data processing device. The data processing device includes: a storage module configured to store a plurality of entries included in a first matrix and position information associated with each of the plurality of entries; a data load module configured to receive the plurality of entries and position information from the storage module, generate a determination result as to whether each of the received entries is zero, and generate an instruction sequence based on the determination result and the position information; and a processing unit configured to generate an operation result by using some of the plurality of entries in accordance with the instruction sequence.

20 Claims, 14 Drawing Sheets

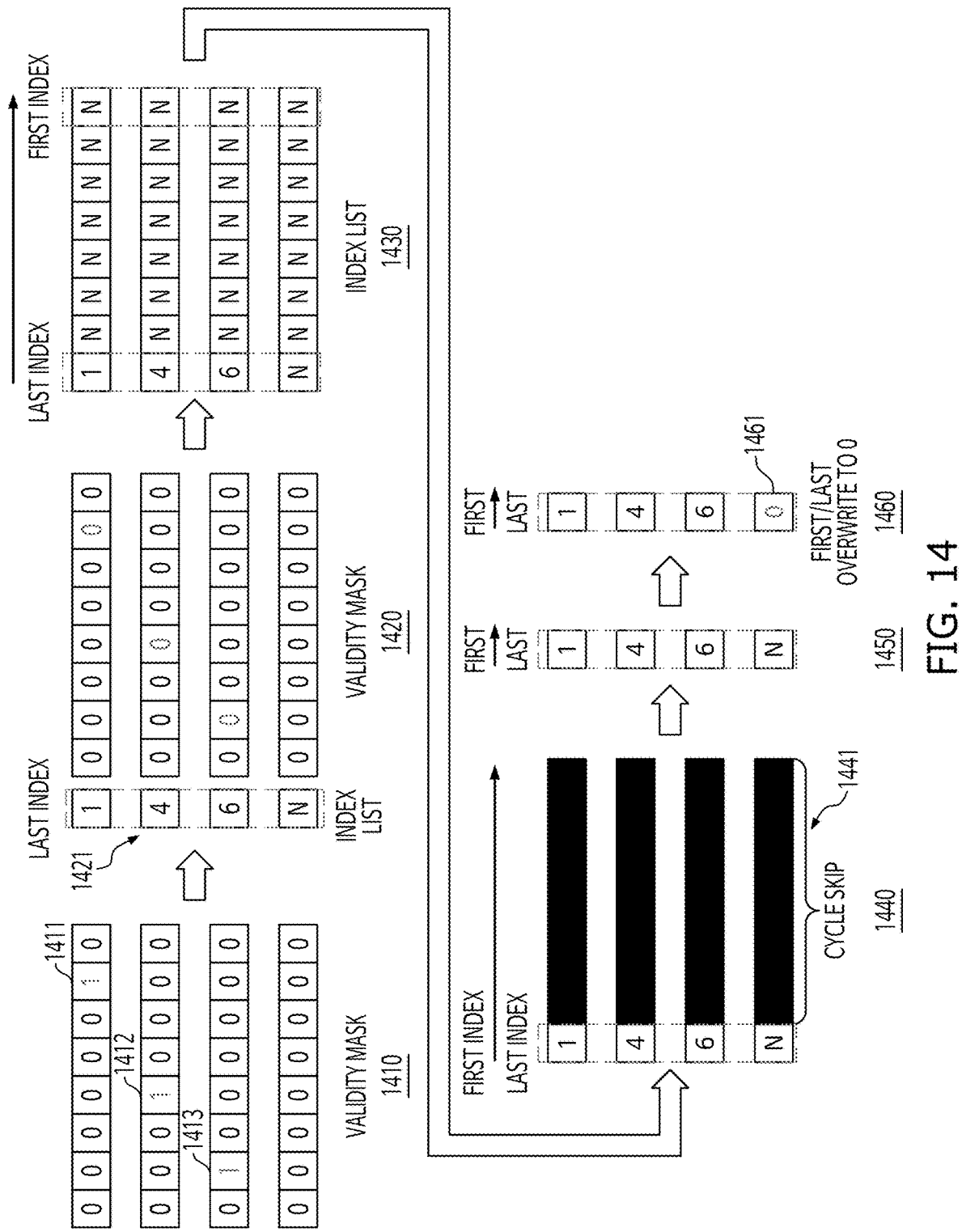

DEVICE AND METHOD FOR OPERATION OF DATA

CROSS-REFERENCE TO RELATED APPLICATION

This application claims priority to Korean Patent Application No. 10-2024-0059873, filed in the Korean Intellectual Property Office on May 7, 2024, the entire contents of which are hereby incorporated by reference.

BACKGROUND

Field

The present disclosure relates to a data processing device and a data operation method using the data processing device.

Description of Related Art

As the performance of operation devices has improved, operations using these operation devices have also been utilized in a variety of ways. In particular, when processing large-scale operations, operations between matrices (vectors) (for example, multiplication between matrices (vectors), etc.) using an operation device have been performed. This is because data requiring large-scale operations, such as three-dimensional graphics acceleration data, data on a wireless network, and bio data, is implemented in the form of a matrix having vector values.

Multiplication between matrices is one of the most fundamental operations in various fields, such as big data analysis, machine learning, image processing, and the like. For example, a plurality of processing elements (PE) included in a data processing device such as an AI accelerator designed to accelerate an artificial intelligence application may perform an operation that multiplies an activation of an artificial neural network by a weight. Furthermore, because the network structure of machine learning requires an enormous amount of multiplication between matrices, performing multiplication between matrices faster and more efficiently may be a crucial factor determining the performance of machine learning.

Meanwhile, in a systolic array structure, a plurality of operation elements are arranged adjacently and connected, and data, such as an activation, a weight, and/or a partial sum of an artificial neural network, may be delivered and reused among the adjacently arranged operation elements. However, if multiplication between matrices including a sparse matrix is performed in a systolic array, the systolic array, which performs a set number and sequence of operations, may not operate normally because the number of non-zero components and the indices associated with these components are irregular. Accordingly, in a data processing device in which data is delivered among adjacently arranged operation elements and reused, like a systolic array, there is a demand for the development of a data operation technique to perform multiplication between matrices including a sparse matrix in a faster and more efficient manner while preventing malfunctions such as RAW (Read After Write) hazards.

SUMMARY OF THE INVENTION

Problems to be Solved

The present disclosure provides a data operation method and a data processing device supporting the same, configured to address the above-described problems.

SUMMARY

The present disclosure may be implemented in various ways, including methods, devices, and/or computer-readable storage media storing a computer program.

According to an embodiment of the present disclosure, a data processing device may include: a storage module configured to store a plurality of entries included in a first matrix and position information associated with each of the plurality of entries; a data load module configured to receive the plurality of entries and the position information from the storage module, generate a determination result as to whether each of the received plurality of entries is zero, and generate an instruction sequence based on the determination result and the position information; and a processing unit configured to generate an operation result by using a portion of the plurality of entries in accordance with the instruction sequence.

According to an embodiment, the data load module may be further configured to generate a validity mask indicating whether each of the received plurality of entries is zero, based on the determination result, and the validity mask may include a first value indicating that each of the plurality of entries is not zero and a second value indicating that each of the plurality of entries is zero.

According to an embodiment, the data load module may be further configured to determine, based on the generated validity mask, a portion of entries, each of which is not zero among the received plurality of entries, and may generate the instruction sequence by using the determined portion of the entries and position information corresponding to the determined portion of the entries.

According to an embodiment, the first matrix may include a plurality of rows and a plurality of columns, and among the plurality of entries, the entries included in each of the plurality of rows or each of the plurality of columns may be grouped into a plurality of sets of entries. Here, the grouped sets of entries may include entries from a first set to an n-th set, where n may be a natural number greater than or equal to 2. Also, each of the sets of entries from the first set through the n-th set may be associated with an index that is numbered in a predetermined direction, and entries located at the same row or column position in each of the sets of entries from the first through the n-th set may be associated with the same index.

According to an embodiment, at least a portion of the plurality of instructions included in the instruction sequence may be generated in association with the index.

According to an embodiment, the instruction sequence may include one or more sets of instructions, each set of instructions may include n instructions, and the data load module may be further configured to calculate the number of entries having the first value, in each of the sets of entries from the first set through the n-th set, and generate a number of sets of instructions equal to a largest number of the calculated numbers.

According to an embodiment, the predetermined direction may be related to an order of input of the entries to the processing unit, among the entries in each of the first through the n-th sets of entries, and the data load module may be further configured to determine, in each of the sets of entries from the first through the n-th sets, a last entry in the predetermined direction that is associated with the first value of the validity mask; change the first value of the validity mask for the determined entry to the second value in each of the sets of entries from the first through the n-th sets, and store an index associated with the determined entry in associated with each of the sets of entries from the first set through the n-th set.

According to an embodiment, after changing the first value of the validity mask for the determined entry to the second value, if it is found that all entries in each of the first through the n-th sets of entries have the second value, the data load module may be further configured to change the validity mask value for the first entry in the predetermined direction to the first value.

According to an embodiment, after changing the value of the validity mask to the first value for the first entry in the predetermined direction, the data load module may is further configured to identify, in each of the sets of entries from the first set through the n-th set, the first entry in the predetermined direction that is associated with the first value of the validity mask, and if the first entry in the predetermined direction that is associated with the first value of the validity mask is not identified in all sets of entries from the first set through the n-th set, generate a first set of instructions that includes instructions associated with the first entries determined in each of the sets of entries from the first set through the n-th set. The generated first set of instructions may be included in the instruction sequence.

According to an embodiment, the operation result may be generated through an operation of a systolic array, and the systolic array may include a plurality of processing units including the processing unit. Also, each of the plurality of instructions included in the first set of instructions may include a sub-instruction to receive an operation result from a previous processing unit in accordance with an order of operations in the systolic array.

According to an embodiment, after generating the first set of instructions, the data load module may be further configured to identify, in each of the sets of entries from the first set through the n-th set, a second entry in the predetermined direction that is associated with the first value of the validity mask, and if at least one set of entries among the sets of entries from the first set through the n-th set has a second entry associated with the first value of the validity mask in the predetermined direction, generate a second set of instructions that includes instructions associated with the identified second entries in each of the sets of entries from the first set through the n-th set. The generated second set of instructions may be included in the instruction sequence as a set of instructions to be executed after the first set of instructions.

According to an embodiment, after generating the first set of instructions, if one or more subsequent entries in the predetermined direction in at least one of the sets of entries among the first through the n-th sets of entries all have the second value, the data load module may be further configured to generate the second set of instructions including an instruction corresponding to the at least one set of entries that includes a NOP (No operation) instruction.

According to an embodiment, after generating the second set of instructions, the data load module may be further configured to generate an m-th set of instructions different from the second set of instructions, until there are no further entries associated with the first value of the validity mask in the predetermined direction in each of the sets of entries from the first set through the n-th set. Here, m may be a natural number greater than or equal to 3, and the m-th set of instructions may be stored in the instruction sequence as a set of instructions to be executed after the second set of instructions.

According to an embodiment, the data load module may be further configured to acquire an index associated with the entries stored in association with each of the sets of entries from the first set through the n-th set, and generate a last set of instructions that includes instructions associated with the acquired index. The generated last set of instructions may be stored in the instruction sequence as a set of instructions executed last.

According to an embodiment, a plurality of processing units including the processing unit may be arranged in an order of operations according to a systolic array structure, and each of the plurality of instructions included in the third set of instructions may include a sub-instruction to transmit the operation result from the processing unit to a next processing unit in the order of operations.

According to an embodiment, the data load module may be further configured to acquire an index associated with the entries that is stored in association with each of the first through the n-th sets of entries, and if, in all of the sets of entries from the first set through the n-th set, a first entry associated with the first value of the validity mask in the predetermined direction is identified, and second entry associated with the first value of the validity mask in the predetermined direction is not identified in any of the sets of entries from the first set through the n-th set, the data load module may be further configured to generate a set of instructions that includes instructions associated with the acquired index. The generated set of instructions may be stored in the instruction sequence as an only set of instructions.

According to an embodiment, the operation result may be generated through an operation of a systolic array. The systolic array may include a plurality of processing units including the processing unit, and the plurality of processing units may be arranged in an order of operations according to the systolic array structure. Also, each of a plurality of instructions included in the set of instructions may receive an operation result from a previous processing unit in accordance with the order of operations in the systolic array, and each of a plurality of instructions included in the last set of instructions may include a sub-instruction to transmit the operation result generated by the processing unit, using the operation result received from the previous processing unit, to a next processing unit of the processing unit.

According to an embodiment, the operation result may be generated through a multiplication operation between the first matrix and a second matrix, in which the plurality of entries included in the first matrix may include values representing activations of an artificial neural network, and the plurality of entries included in the second matrix may include values representing weights of the artificial neural network. At least a portion of the plurality of entries included in the second matrix may be pre-loaded and stored in the processing unit.

According to an embodiment, a plurality of processing units including the processing unit may be arranged in the order of operations according to a systolic array structure, the first matrix may be extended by using a matrix having a same size as either the same row or the same column of the first matrix, and the second matrix may be extended by using a matrix having a same size as either the same row or the same column of the second matrix. A previous processing unit of the processing unit may be associated with a matrix extended in either a left or an upper direction, from each of the first and second matrices, and, in accordance with the order of operations of the systolic array, a next processing unit of the processing unit may be associated with a matrix extended in either a right or a lower direction, from each of the first and second matrices.

According to an embodiment, a number of sub-instructions for at least one of an operation or communication included in each of the plurality of instructions of the instruction sequence, executed by the processing unit, may be identical to a number of rows or a number of columns of the first matrix.

According to an embodiment of the present disclosure, a data operation method performed by the data processing device may include: receiving a plurality of entries included in a first matrix and position information associated with each of the plurality of entries; generating a determination result as to whether each of the received plurality of entries is zero; generating an instruction sequence based on the determination result and the position information; and generating an operation result by using a portion of the plurality of entries, in accordance with the generated instruction sequence.

According to an embodiment, generating the instruction sequence may include: generating, based on the determination result, a validity mask indicating whether each of the received plurality of entries is zero, wherein the validity mask includes a first value indicating that each of the plurality of entries is not zero and a second value indicating that it is zero; and determining, based on the generated validity mask, a portion of the entries that are not zero among the plurality of entries, and generating the instruction sequence by using the determined entries and position information corresponding to the determined entries.

According to some embodiments of the present disclosure, an instruction sequence for a matrix operation (for example, a multiplication operation) may be generated based on non-zero entries of a matrix. Here, the instruction sequence may be configured to calculate the number of non-zero entries in each of the plurality of sets of entries in the matrix, and include the same number of instruction sets as the greatest number among the calculated numbers. Furthermore, each set of instructions may include a number of instructions equal to the number of those sets. Through such a configuration, the matrix operation may be performed more rapidly and efficiently, while preventing malfunctions. Also, regardless of how many non-zero entries are present in the matrix, an instruction sequence may be generated so that the processing units included in the systolic array are executed in order.

According to some embodiments of the present disclosure, a data load module may include a pipeline structure corresponding to each of the entries in rows or columns of a matrix, and when a processing unit processes a thread corresponding to this pipeline, interleaving among threads may be carried out in consideration of the number of sub-instructions in the processing unit's hardware structure. In this case, even if no time is reduced in performing an operation in a thread corresponding to a pipeline for which no operation is needed by performing NOP (No Operation), resource consumption such as battery consumption may be reduced.

The effects of the present disclosure are not limited to those mentioned above, and other effects not mentioned may be clearly understood by those of ordinary skill in the art (referred to as "those of ordinary skill") from the descriptions in the claims.

BRIEF DESCRIPTION OF THE DRAWINGS

Embodiments of the present disclosure will be described below with reference to the accompanying drawings, in which like reference numerals denote like elements, without being limited thereto.

FIGS. 12 to 14 are diagrams for explaining how to generate an index list, based on a validity mask, which is used to generate an instruction sequence according to various embodiments of the present disclosure.

DETAILED DESCRIPTION

Figure 1:
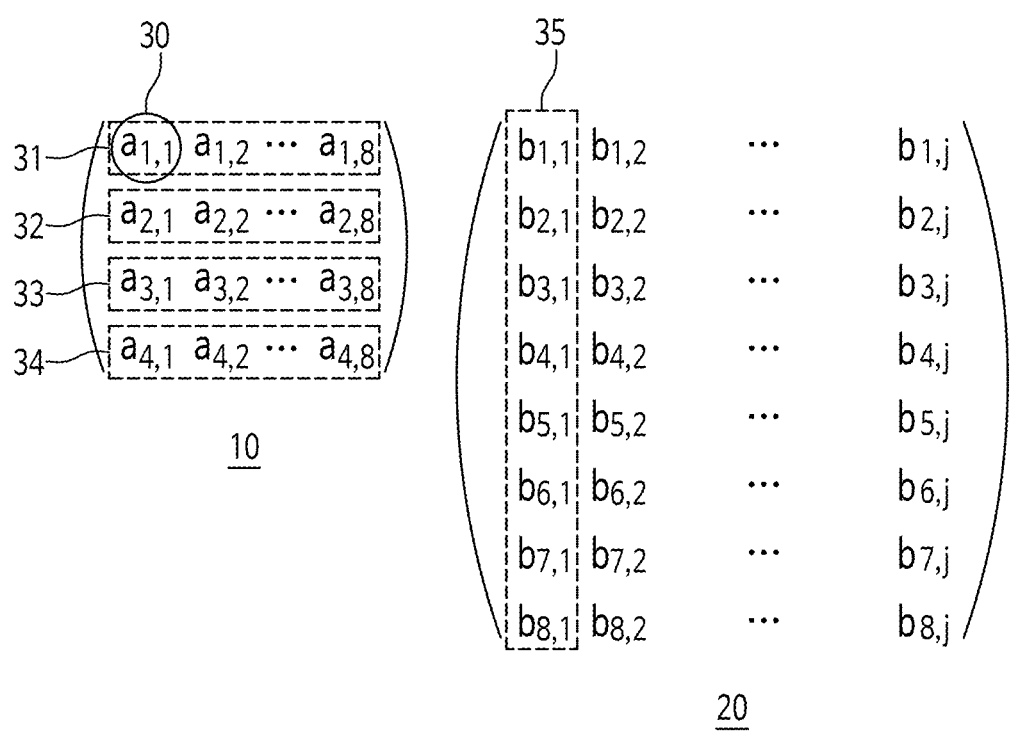
FIG. 1 illustrates an example showing the configuration of two matrices used for a matrix operation according to an embodiment of the present disclosure.

Hereinafter, specific details for the implementation of the present disclosure will be described in detail with reference to the accompanying drawings. However, in the following description, well-known functions or configurations are not described in detail if it is determined that such descriptions may obscure the essence of the present disclosure unnecessarily.

In the accompanying drawings, the same or corresponding components are assigned the same reference numerals. Also, in the descriptions of the embodiments below, repeated explanations of the same or corresponding components may be omitted. Nevertheless, omission of technical details does not mean that such components are not included in certain embodiments.

The advantages and features of the disclosed embodiments, and methods of achieving them, will be clarified by referring to the embodiments described below in conjunction with the accompanying drawings. However, the present disclosure is not limited to the embodiments described herein, but may be implemented in various forms, and these embodiments are merely provided so that the disclosure is thorough and fully conveys the scope of the disclosure to those of ordinary skill in the art.

Brief explanations of the terms used in this specification are given below, and embodiments disclosed herein are described in detail thereafter. The terminology used herein is selected from terms that are widely used at present, in consideration of the functions in the present disclosure, but these terms may vary depending on the intent of those skilled in the art, judicial precedents, or the emergence of new technologies. Also, certain terms might be arbitrarily selected by the applicant, in which case their meanings will be described in detail in the description of the invention. Therefore, the terminology used herein should not be interpreted as merely the name of a term, but should be defined by the meaning it has and by the overall content of the present disclosure.

Unless clearly limited to the singular by context, the singular expression used in this specification includes the plural. Also, unless clearly limited to the plural by context, the plural expression includes the singular. Throughout the present specification, when a certain portion is described as including a certain component, this does not exclude other components, unless specifically indicated otherwise, and it means that other components may be further included.

Also, the terms "module" or "unit" as used in this specification refer to software or hardware components, and each "module" or "unit" performs certain roles. However, the terms "module" or "unit" are not limited to software or hardware. A "module" or "unit" may be configured to be included in an addressable storage medium and may be configured to operate with one or more processors. Thus, for example, a "module" or "unit" may include software components such as object-oriented software components, class components, and task components, as well as processes, functions, attributes, procedures, subroutines, program code segments, drivers, firmware, microcode, circuits, data, databases, data structures, tables, arrays, or variables, or at least one of these. The functions included in the components, modules, or units described herein may be combined into fewer components, modules, or units, or further separated into additional components, modules, or units.

According to an embodiment of the present disclosure, a "module" or a "unit" may be implemented by a processor and a memory. A "processor" should be broadly interpreted to include a general-purpose processor, a central processing unit (CPU), a microprocessor, a digital signal processor (DSP), a controller, a microcontroller, a state machine, a dedicated processor, etc. In some environments, a "processor" may refer to an ASIC (application-specific integrated circuit), a PLD (programmable logic device), an FPGA (field-programmable gate array), an accelerator (for example, a graphics processing unit (GPU), a neural network processing unit (NPU), a tensor processing unit (TPU), etc.), a processing element (PE), or the like. A "processor" may also refer to a combination of processing devices such as a combination of a DSP and a microprocessor, a combination of multiple microprocessors, a combination of one or more microprocessors combined with a DSP core, or any other such configuration. Also, a "memory" should be broadly interpreted to include any electronic component capable of storing electronic information. A "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or marking data storage devices, registers, and the like. If a processor can read information from and/or write information to a memory, the memory is said to be in electronic communication with the processor. A memory integrated into a processor is in electronic communication with the processor.

Also, in the embodiments below, terms such as first, second, A, B, (a), and (b) are used only to distinguish one component from another, and the use of such terms does not limit the nature, sequence, or order of the relevant components.

In the embodiments below, if a certain component is described as being "connected," "coupled," or "attached" to another component, the component may be directly connected or attached with that other component, but it should be understood that another component may be "connected," "coupled," or "attached" between the respective components.

Also, in the embodiments below, "include" or "comprising" does not exclude the presence or addition of one or more other components, steps, operations, and/or elements in addition to the mentioned components, steps, operations, and/or elements.

As used in the embodiments below, the phrase "each of a plurality of A" may refer to each of all components included in the plurality of A, or it may refer to each of some components included in the plurality of A.

In the embodiments below, a matrix may include at least one vector as a plurality of entries. In other words, a matrix may be generated by connecting or combining one or more vectors. For example, each of these matrices may be associated with a vector representing an activation, a weight, or similar elements of an artificial neural network. Accordingly, in the description below, matrices or entries included in matrices may be used interchangeably with vectors.

Various embodiments of the present disclosure will be described in detail below with reference to the accompanying drawings.

FIG. 1 illustrates an example showing the configuration of two matrices 10 and 20 used for a matrix operation according to an embodiment of the present disclosure. A matrix may include one or more rows and one or more columns, and a plurality of entries. Further, each of the plurality of entries included in the matrix has a value, and may be associated with row and column position information in the matrix, and then stored in a storage medium or a storage module accessible by the data processing device, the data operation system, the data load module, and/or the processing unit of the present disclosure, described below. For example, a1,1 (30) may be located at row 1, column 1 in the first matrix 10 and have a value. Although a1,1 is indicated here by a combination of letters and numbers for convenience of explanation, it may include any real number value or be represented by any real number value.

As shown in FIG. 1, for example, the first matrix 10 may include entries $a_{1,1}$, $a_{1,2}$, ..., $a_{1,8}$, $a_{2,1}$, $a_{2,2}$, ..., $a_{2,8}$, $a_{3,1}$, $a_{3,2}$, ..., $a_{3,8}$, $a_{4,1}$, $a_{4,2}$, ..., $a_{4,8}$. That is, the first matrix 10 may be a 4 (rows)×8 (columns) matrix having 32 entries.

Also, a second matrix 20 may include $b_{1,1}, b_{1,2}, \ldots, b_{1,j}$, $b_{2,1}, b_{2,2}, \ldots, b_{2,j}, b_{3,1}, b_{3,2}, \ldots, b_{3,j}, b_{4,1}, b_{4,2}, \ldots, b_{4,j}$, $b_{5,1}, b_{5,2}, \ldots, b_{5,j}, b_{6,1}, b_{6,2}, \ldots, b_{6,j}, b_{7,1}, b_{7,2}, \ldots, b_{7,j}$, $b_{8,1}, b_{8,2}, \ldots, b_{8,j}$ (where j is a natural number greater than or equal to 2). Thus, the second matrix 20 may be an 8 (rows)×j (columns) matrix. In the present disclosure, the first matrix 10 and/or the second matrix 20 may be a sparse matrix whose majority of entries have a value of zero.

A data processing device (not shown) may perform various operations between matrices, such as addition, multiplication, subtraction, and so on, using the first matrix 10 and the second matrix 20. According to an embodiment, the data processing device may perform a multiplication operation between the first matrix 10 and the second matrix 20. In this case, the data processing device may include a processing unit (not shown) that includes a multiplier for multiplying each entry of the first matrix 10 by each entry of the second matrix 20, and an adder for adding the products thus obtained.

According to an embodiment, each of the first matrix 10 and the second matrix 20 may include a plurality of entries corresponding to an arbitrary vector. For example, the first matrix 10 may include a vector representing an activation of an artificial neural network, while the second matrix 20 may include a vector representing a weight of an artificial neural network, but these are merely examples and are not limiting.

As shown in FIG. 1, the data processing device may carry out a multiplication operation between the first matrix 10 and the second matrix 20, in which an inner product is performed between each set of entries (i.e., each row vector) included in rows 31, 32, 33, 34 of the first matrix 10 (the matrix on the left side) and the entries in each of all columns (i.e., each column vector) including the first column 35 of the second matrix 20 (the matrix on the right side). In this case, the number of entries included in a row of the first matrix 10 and the number of entries included in a column of the second matrix 20 must be the same. For example, as illustrated in FIG. 1, each row of the first matrix 10 and each column of the second matrix 20 both have 8 entries.

In the embodiments described below, for convenience of explanation, it is assumed that the multiplication between matrices being performed is an operation that computes the inner product of vectors, and it is described that multiplication and addition are both performed by using each row (set of entries) included in the rows of the first matrix 10 and each column (set of entries) included in the columns of the second matrix 20. This is merely one example and not limiting. For instance, if an outer product of vectors is performed as the multiplication between matrices, columns included in the first matrix 10 and rows included in the second matrix 20 may be used for the matrix multiplication operation. As another example, if a row-wise product of vectors is performed as the multiplication between matrices, the rows of the first matrix 10 and the rows of the second matrix 20 may be used for the matrix multiplication operation. As yet another example, if a column-wise product of vectors is performed as the multiplication between matrices, the columns of the first matrix 10 and the columns of the second matrix 20 may be used for the matrix multiplication operation.

Moreover, in the embodiments described below, for convenience of explanation, it is assumed that information about left matrix 10 (i.e., first matrix) is loaded to the data load module so that an instruction sequence is generated, while information about right matrix 20 (i.e., second matrix) is pre-stored in the processing unit. However, this is not limiting; alternatively, information about right matrix 20 (the second matrix) could be loaded to the data load module so that the instruction sequence is generated, while information about left matrix 10 (the first matrix) is pre-stored in the processing unit.

Also, in FIG. 1, the first matrix 10 is shown as a 4×8 matrix, and the second matrix 20 is shown as an 8×j matrix, but these are merely examples. Any matrices may be used as long as they satisfy the condition that the number of entries included in the rows or columns of the first matrix 10 and the second matrix 20 are the same, in order to perform any one of the above-mentioned vector products.

Figure 2:
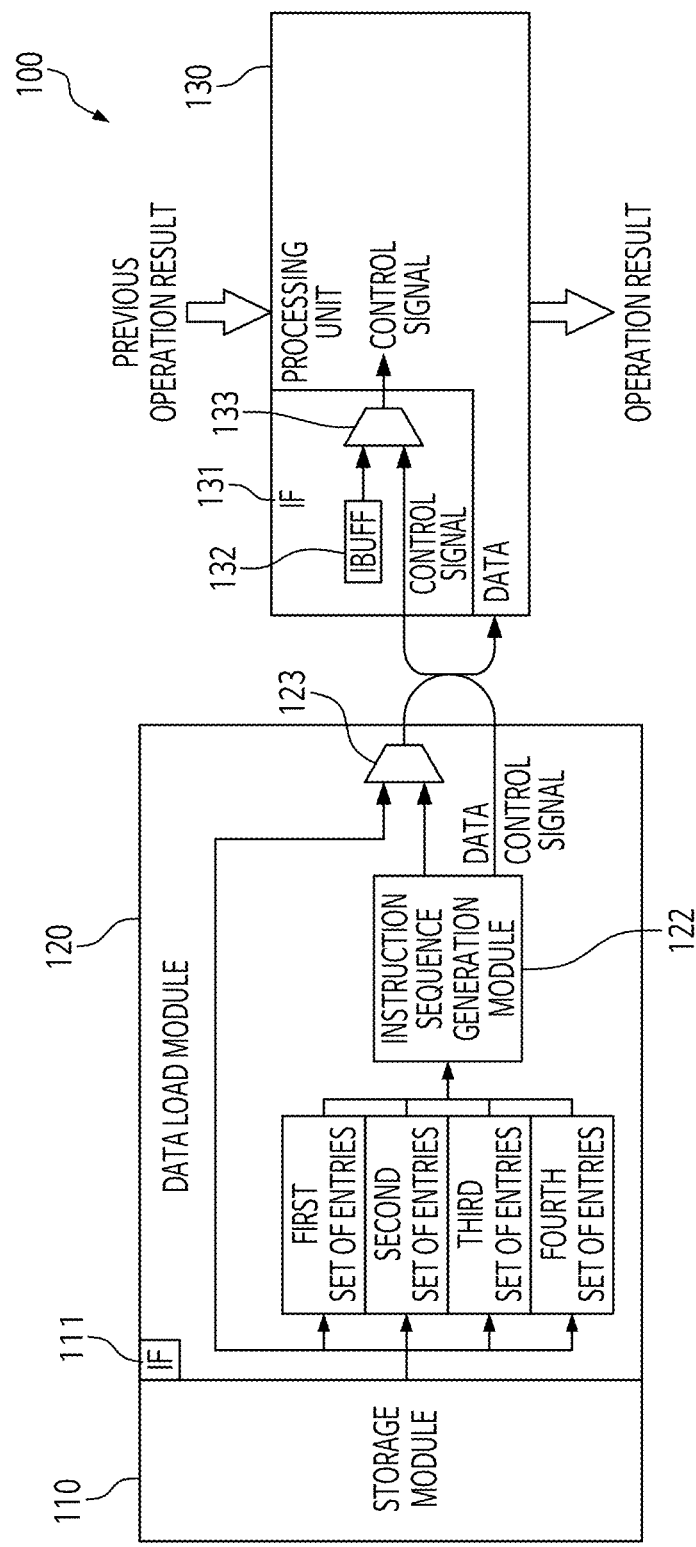
FIG. 2 is a diagram illustrating the structure of a data processing device according to an embodiment of the present disclosure.

FIG. 2 is a diagram illustrating the structure of a data processing device 100 according to an embodiment of the present disclosure. The data processing device 100 may be a device configured to perform an operation (for example, multiplication, etc.) between a first matrix and a second matrix. For example, the first matrix may refer to the first matrix 10 of FIG. 1, and the second matrix may refer to the second matrix 20 of FIG. 1, although not limited thereto. As shown in FIG. 2, the data processing device 100 may include a storage module 110, a data load module 120, and a processing unit 130. However, the configuration of the data processing device 100 is not limited to the above. According to various embodiments, the data processing device 100 may omit at least one of these components or may include at least one other component.

According to an embodiment, the storage module 110 may store a plurality of entries (entries) included in a first matrix and position information associated with each of the plurality of entries. For example, in a multiplication operation that computes the inner product, the plurality of entries included in the first matrix, which is the left matrix, may be grouped into sets of entries from a first set to an n-th set (where n is a natural number greater than or equal to 2), each set corresponding to a row of the first matrix. As shown in FIG. 2, for example, the storage module 110 may store entries in the first set through the fourth set, grouped from the first matrix, along with the position information of each entry, and may provide the sets of entries from the first to the fourth sets of entries, as well as the position information of each entry, to the data load module 120. Here, the number of rows in the first matrix may be 4.

The data load module 120 may include an IF (Instruction Fetch) 111, an instruction sequence generation module 122, and a multiplexer (MUX) 123. The IF 111 may receive or fetch an instruction used for operation of the data load module 120 from the storage module 110. Additionally or alternatively, the IF 111 may be programmable so that it contains instructions used for operation of the data load module 120.

As shown, based on an instruction obtained via the IF 111, the data load module 120 may receive, for example, the entries included in each of the four rows of the first matrix (such as the first matrix 10 of FIG. 1): the first set of entries (e.g., $a_{1,1}, a_{1,2}, \ldots, a_{1,8}$) included in the first row, the second set of entries (e.g., $a_{2,1}, a_{2,2}, \ldots, a_{2,8}$) included in the second row, the third set of entries (e.g., $a_{3,1}, a_{3,2}, \ldots a_{3,8}$) included in the third row, and the fourth set of entries (e.g., $a_{4,1}, a_{4,2}, \ldots, a_{4,8}$) included in the fourth row. These received entries may be provided to the instruction sequence generation module 122 and a MUX 123.

The instruction sequence generation module 122 may generate a determination result indicating whether each of the received plurality of entries is zero, and may generate an instruction sequence (for example, a micro-operation sequence) based on the generated determination result and the position information of the plurality of entries in the first matrix. The plurality of entries may include entries in the first through fourth sets.

According to an embodiment, the instruction sequence generation module 122 may generate a validity mask, which indicates whether each of the received plurality of entries is zero, based on the determination result. The validity mask may include a first value (e.g., 1) indicating that each of the plurality of entries is not zero, and a second value (e.g., 0) indicating that each entry is zero. The instruction sequence generation module 122 may determine certain entries that are not zero among the plurality of entries based on the generated validity mask, and may generate the instruction sequence by using the determined entries and the position information corresponding to those entries. The generated instruction sequence may be provided to the MUX 123. A more detailed explanation of how this instruction sequence is generated is provided below with reference to FIGS. 6 through 9. Also, a more detailed explanation of how to generate an index list, used in the instruction sequence, based on the validity mask is provided below with reference to FIGS. 12 to 14.

The MUX 123 may receive the plurality of entries and the instruction sequence, and may output data including a portion of the plurality of entries and the instruction sequence. The data and instruction sequence thus output may be provided to a processing unit 130 and the instruction sequence generation module 122. In FIG. 2, a control signal for the MUX 123 is omitted to avoid confusion, but a control signal for the MUX 123 may be provided from the instruction sequence generation module 122 to the MUX 123 so that data, including a portion of the plurality of entries, and instructions included in the instruction sequence are output in a predetermined order.

The processing unit 130 may receive, from the instruction sequence generation module 122, control signals that include the instruction sequence and a portion of the plurality of entries. Such control signals may be provided to an IF 131 included in the processing unit 130, and the data may be provided separately to the processing unit 130.

According to an embodiment, as illustrated in FIG. 2, the IF 131 may include an IBUFF (Instruction Buffer) 132 and a multiplexer (MUX) 133. The IBUFF 132 may include instructions for operation (e.g., operation, communication, etc.) of the processing unit 130. For example, the instructions included in the IBUFF 132 may include any sub-instruction for carrying out the operation in the processing unit 130, such as a sub-instruction to receive matrix entries (vectors) from a previous processing unit in the systolic array, a sub-instruction to multiply entries, a sub-instruction to add multiplied values, or a sub-instruction to output the resulting value (in vector or matrix form) to the next processing unit, and so forth, but is not limited thereto.

The MUX 133 in the IF 131 may receive a control signal including instructions for operation and/or communication from the data load module 120, and may receive an instruction for operation from the IBUFF 132. In accordance with control signals for the MUX 133, which may be received from the IBUFF 132 and/or the data load module 120, a control signal including sub-instructions for operation and/or communication may be output. According to these control signals for the MUX 133, a control signal including sub-instructions for operation and/or communication by the processing unit may be output in a predetermined order.

Based on the control signals thus output and data received from the data load module 120, matrix operations may be performed. In this case, a plurality of entries included in the right matrix (second matrix) may be pre-loaded and stored in a storage medium (e.g., a register, etc.) in the processing unit 130, for an operation with the first matrix. Also, the processing unit 130 may include a communication module (not shown), a multiplier (not shown), and an adder (not shown). The communication module may be configured to receive a previous operation result from a previous processing unit connected to the processing unit 130 or to provide an operation result generated by the processing unit 130 to a next processing unit connected to the processing unit 130, under the systolic array structure. Alternatively, if there is no previous processing unit for the processing unit 130, it may receive a signal indicating the absence of a previous result or it may simply receive no signal. The communication between the processing units is described in more detail with reference to FIG. 4 below.

Figure 3:
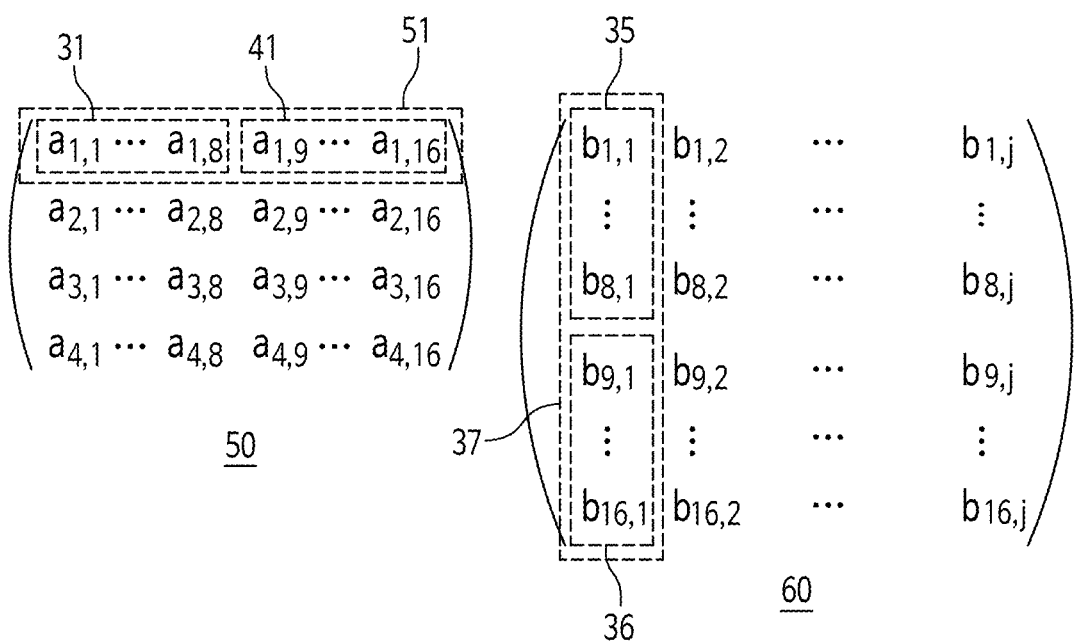
FIG. 3 is a diagram illustrating extended versions of two matrices used for a matrix operation according to an embodiment of the present disclosure.

FIG. 3 is a diagram illustrating two extended matrices 50 and 60, which are used for operations according to an embodiment of the present disclosure. The matrix 50 may be an extended version of the first matrix 10 in FIG. 1, and the matrix 60 may be an extended version of the second matrix 20 in FIG. 1. The matrices 50 and 60 may be generated by extending each of matrices 10 and 20 using a matrix having the same size as either a row or a column of the first matrix 10 and the second matrix 20, respectively.

As with the first matrix 10 and the second matrix 20 in FIG. 1, the matrices 50 and 60 respectively may be considered as the left matrix and the right matrix in a multiplication operation between matrices performing an inner product. In such a configuration, as shown in FIG. 3, the matrix 50 may include the entries of the first matrix 10 of FIG. 1 as well as additional entries $a_{1,9}, \ldots, a_{1,16}, a_{2,9}, \ldots, a_{2,16}, a_{3,9}, \ldots, a_{3,16}, a_{4,9}, \ldots, a_{4,16}$. That is, the matrix 50 may be a 4 (rows)×16 (columns) matrix having 64 entries. The matrix 60 may include the entries of the second matrix 20 of FIG. 2 and additional entries $b_{9,1}, \ldots, b_{16,1}, b_{9,2}, \ldots, b_{16,2}, \ldots, b_{9,j}, \ldots, b_{16,j}$ (where j is a natural number greater than or equal to 2). That is, the matrix 60 may be a 16 (rows)×j (columns) matrix.

As with the first matrix 10 in FIG. 1, the plurality of entries included in the matrix 50 may be grouped into four sets of entries, based on rows. Similarly, as with the second matrix 20 in FIG. 1, the plurality of entries included in the matrix 60 may be grouped into j sets of entries, based on columns. In addition, each grouped set of entries in the matrices 50 and 60 may be subdivided based on the row or column size of matrices 10 and 20 of FIG. 1. For example, the first set of entries (51, i.e., first row vector) in the matrix 50 may include 16 entries, which may be subdivided into $a_{1,1}, \ldots, a_{1,8}$ (31) and $a_{1,9}, \ldots, a_{1,16}$ (41), based on the size of 8 entries of the row in matrix 10. Similarly, the first set of entries (37, i.e., first column vector) in the matrix 60 may include 16 entries, which may be subdivided into $b_{1,1}, \ldots, b_{8,1}$ (35) and $b_{9,1}, \ldots, b_{16,1}$ (36), based on the size of 8 entries in the column of the second matrix 20. The subdivided entries may be used for an operation in each processing unit included in a systolic array. The method of performing an operation using such a systolic array is further explained below with reference to FIG. 4.

Figure 4:
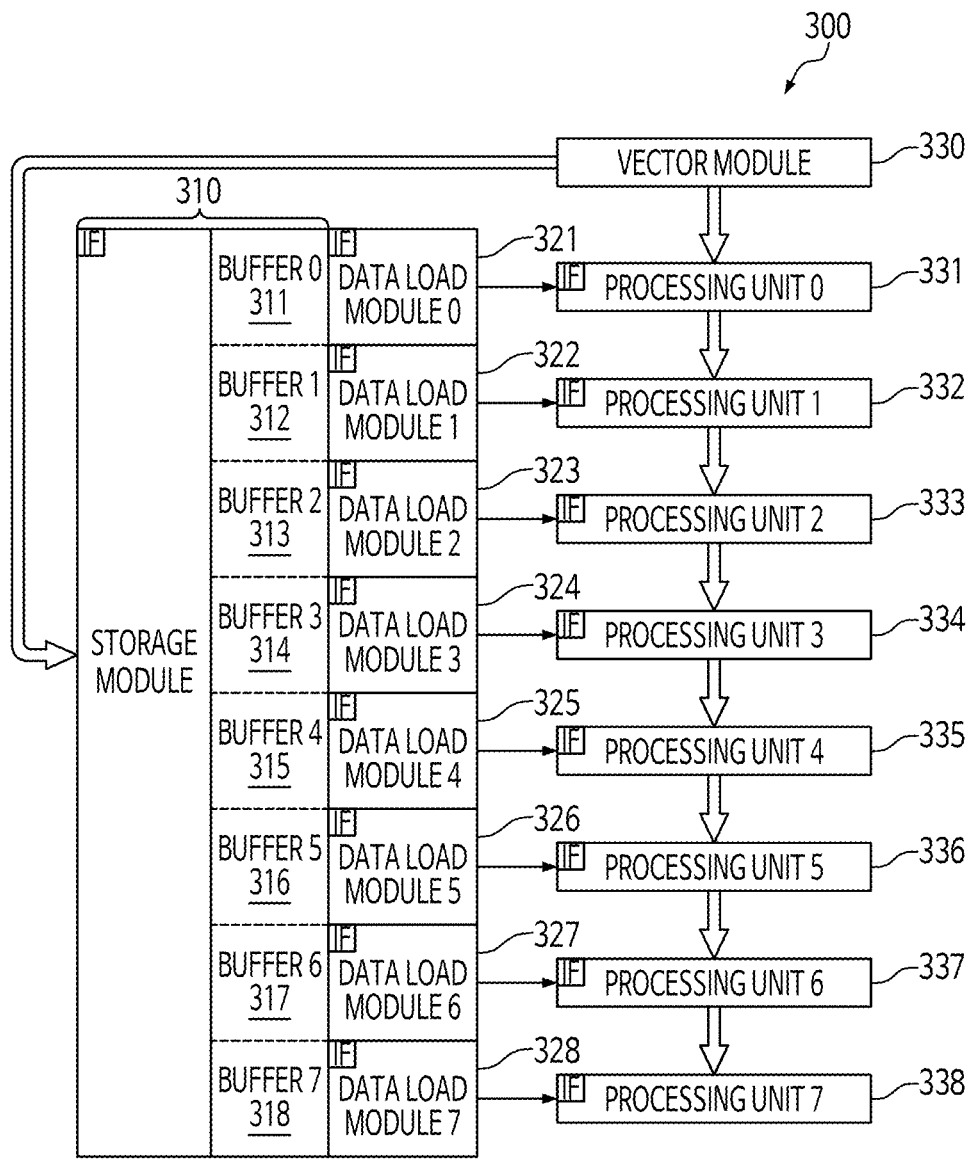
FIG. 4 is a diagram illustrating the internal structure of a data operation system including a plurality of processing units in a systolic array, according to an embodiment of the present disclosure.

FIG. 4 is a diagram illustrating an internal structure of a data operation system 300 including a plurality of processing units in a systolic array according to an embodiment of the present disclosure. Data operation system 300 may include a storage module 310, a plurality of data load modules 321, 322, 323, 324, 325, 326, 327, 328, a vector module 330, and a plurality of processing units 331, 332, 333, 334, 335, 336, 337, 338. Also, the storage module 310 may include a plurality of buffers 311, 312, 313, 314, 315, 316, 317, 318. However, the configuration of data operation system 300 is not limited thereto. According to various embodiments, data operation system 300 may omit at least one of the above components or may include one or more other components. For example, the vector module 330 may be excluded from data operation system 300.

Each of the above-described components of data operation system 300 may include an IF (Instruction Fetch). The IF may receive or fetch an instruction from another storage medium. Additionally or alternatively, an instruction may be programmed and stored in the IF itself. These instructions may be executed by the above-described components of data operation system 300.

The vector module 330 may include arbitrary values represented in a vector format (matrix format). For example, the vector module 330 may include a vector representing an activation of an artificial neural network and/or a vector representing a weight of an artificial neural network. These vectors (i.e., matrix entries) and their position information may be provided to the storage module 310 and to the plurality of processing units 331 to 338 for systolic array operation. For example, the vector representing an activation of an artificial neural network and its associated position information may be provided to the storage module 310, and the vector representing a weight of an artificial neural network and its associated position information may be provided to each of the plurality of processing units 331 to 338. According to an embodiment, the vector module 330 may include a previous operation result output by a previous processing unit and/or a previous processing unit under the systolic array structure, and may provide the previous operation result to the zeroth processing unit 331, which executes the earliest operation order.

According to an embodiment, in data operation system 300, one buffer, one data load module corresponding to that buffer, and one processing unit corresponding to both of them may be included in a single data processing device. Such a data processing device may correspond to the data processing device 100 in FIG. 1. In this configuration, for example, the zeroth buffer 311, the zeroth data load module 321, and the zeroth processing unit 331 may each correspond to the storage module 110, the data load module 120, and the processing unit 130 of FIG. 1. That is, the zeroth buffer 311, the zeroth data load module 321, and the zeroth processing unit 331, which are arranged first in the systolic array operation order, may be included in a single data processing device (hereinafter "zeroth data processing device"). Similarly, among the first to seventh buffers 312 to 318, the first to seventh data load modules 322 to 328, and the first to seventh processing units 332 to 338, the buffer, data load module, and processing unit used in each operation under the systolic array structure may be grouped into a single data processing device. As shown in FIG. 4, the first buffer 312, the first data load module 322, and the first processing unit 332 may be included in a single data processing device (hereinafter "first data processing device"), and likewise, the second to seventh buffers 313 to 318, the second to seventh data load modules 323 to 328, and the second to seventh processing units 333 to 338 may be grouped into six data processing devices (hereinafter "second to seventh data processing devices," respectively). In this embodiment, data operation system 300 may include eight data processing devices.

The plurality of processing units 331 to 338 may be arranged in the order of operations according to a systolic array structure. Each of the processing units 331 to 338 may generate an operation result by using the previous operation result from a previous processing unit and transmit the generated operation result to the next processing unit.

In one embodiment, when data operation system 300 performs an operation (for example, a multiplication operation) between matrices, in the order of operations of a systolic array structure, a plurality of data processing devices in data operation system 300 may each be allocated a matrix of the same size. For instance, the left matrix for multiplication may be extended to have a size of 4 (rows)×8 (columns), allocated to each of the plurality of data processing devices 331 to 338, and the right matrix may be extended to have a size of 8 (rows) j (columns) (j is a natural number), allocated to each of the plurality of data processing devices 331 to 338. The plurality of entries in the matrix of that size may be used by one of the processing units 331 to 338 to perform the operation between matrices.

According to the order of operations in a systolic array, the previous processing unit of a given processing unit may be associated with a matrix extended in one direction, either the left or top, from each of the left and right matrices. Likewise, according to the order of operations in a systolic array, the next processing unit of a given processing unit may be associated with a matrix extended in one direction, either the right or bottom, from each of the left and right matrices. For example, in the case of a multiplication operation between matrices performing an inner product, the left matrix may be extended in the right direction, and the right matrix may be extended in the downward direction. In this configuration, because the eight processing units included in data operation system 300 are arranged in a systolic array, data operation system 300 may perform a multiplication operation between a left matrix having a size of 4 (rows)×64 (columns, 8×8) and a right matrix having a size of 64 (rows, 8×8)×j (columns).

A portion of the matrix multiplication operation between matrices using the processing units of this systolic array may be described by way of example, using the matrix 50 extended with a size of 4 (rows)×8 (columns), and the matrix 60 extended with a size of 8 (rows)×j (columns), as illustrated in FIG. 3. The first set of entries 51 of row 1 in the left matrix 50 (i.e., the row vector) may be subdivided into 8 entries, $a_{1,1}, \ldots, a_{1,8}$ (31, hereinafter "(1-1)-th set of entries") and then another 8 entries $a_{1,9}, \ldots, a_{1,16}$ (41, hereinafter "(1-2)-th set of entries"), which together total 16 entries. Similarly, the second set of entries of row 2 in the matrix 50 may be subdivided into (2-1)-th set of entries $(a_{2,1}, \ldots, a_{2,8})$ and (2-2)-th set of entries $(a_{2,9}, \ldots, a_{2,16})$. Likewise, the third set of entries of row 3 in the matrix 50 may be subdivided into (3-1)-th set of entries $(a_{3,1}, \ldots, a_{3,8})$ and (3-2)-th set of entries $(a_{3,9}, \ldots, a_{3,16})$. Also, the fourth set of entries of row 4 in the matrix 50 may be subdivided into (4-1)-th set of entries $(a_{4,1}, \ldots, a_{4,8})$ and (4-2)-th set of entries $(a_{4,9}, \ldots, a_{4,16})$.

Likewise, the first set of entries (36) in the first column vector of the right matrix 60 may be subdivided into the entries of the first set (36, 1st column vector) of the right matrix (60) consisting of 8 entries, namely, $b_{1,1}, \ldots, b_{8,1}$ (35, hereinafter referred to as entries of the 1-1 set), and then another 8 entries in the order of multiplication $b_{9,1}, \ldots, b_{16,1}$ (37, also referred to hereinafter as entries of the 1-2 set). In this manner, the right matrix 60 may yield a j-th set of entries, each of which includes two sets of entries.

In this configuration, a 4 (rows)×8 (columns) matrix consisting of the (1-1)-th set of entries, the (2-1)-th set of entries, the (3-1)-th set of entries, and the (4-1)-th set of entries of the left matrix 50 may be stored in the zeroth buffer 311 and provided to the zeroth data load module 321. The zeroth data load module 321 may generate an instruction sequence for operating the zeroth processing unit 331, and provide it, along with the 4 (rows)×8 (columns) matrix, to the zeroth processing unit 331. A portion or all of the (1-1)-th set of entries, . . . , the (1-j)-th set of entries of the right matrix 60 may be pre-loaded and stored in the zeroth processing unit 331. For this purpose, the zeroth processing unit 331 may receive the (1-1)-th set of entries, . . . , the (1-j)-th set of entries of the right matrix 60 from the vector module 330 and/or the storage module 310.

Then, the zeroth processing unit 331 may generate a result of the multiplication operation between the 4 (rows)×8 (columns) matrix and the 8 (rows)×j (columns) matrix, based on the instruction sequence received from the zeroth data load module 321. In this case, if the vector received from the vector module 330 is a previous operation result value associated with the multiplication operation between matrices, the zeroth processing unit 331 may generate the operation result by adding that previous operation result value to the result of the multiplication.

The operation result thus generated may be provided to the first processing unit 332. A portion of instructions in the instruction sequence provided by the zeroth data load module 321 may include sub-instructions to receive a vector from the vector module 330 and/or to provide the operation result to the first processing unit 332. In one embodiment, the operation result may be divided according to the instruction corresponding to each set of entries included in the instruction sequence and delivered to the first processing unit 332. A more detailed explanation of this specific method is given below with reference to FIG. 9.

A 4 (rows)×8 (columns) matrix made of the (1-2)-th set of entries, the (2-2)-th set of entries, the (3-2)-th set of entries, and the (4-2)-th set of entries of the matrix 50 may be stored in the first buffer 312 and provided to the first data load module 322. The first data load module 322 may generate an instruction sequence for operating the first processing unit 332, and provide the generated instruction, along with the 4 (rows)×8 (columns) matrix, to the first processing unit 332. A portion or all of the (2-1)-th set of entries, . . . , the (2-j)-th set of entries of the right matrix 60 may be pre-loaded and stored in the zeroth processing unit 331. For this purpose, the first processing unit 332 may receive the (2-1)-th set of entries, . . . , the (2-j)-th set of entries of the right matrix 60 from the vector module 330 and/or the storage module 310.

Then, first processing unit 332 may generate a result of the multiplication operation between the 4 (rows)×8 (columns) matrix and the 8 (rows)×j (columns) matrix, based on the instruction sequence received from the first data load module 322. In this case, the previous operation result value associated with the multiplication operation between matrices, which was received from the zeroth processing unit 331, may be added to the result of this newly performed multiplication to produce the operation result.

The operation result thus generated may be provided to the second processing unit 333. A portion of instructions in the instruction sequence provided by the first data load module 322 may include sub-instructions to receive a vector from the zeroth processing unit 331 and/or to provide the operation result to the second processing unit 333. In one embodiment, the operation result may be delivered in portions to the second processing unit 333, according to the instructions corresponding to each set of entries included in the instruction sequence.

The above-described operation method for the zeroth processing unit 331 and first processing unit 332 in a systolic array structure may likewise be applied to each of the processing units 2 (333) through 7 (338). Following the order of operations in the systolic array structure, if each of the plurality of processing units 331 to 338 performs a multiplication operation between a 4 (rows)×8 (columns) matrix and an 8 (rows)×j (columns) matrix, then processing unit 7 (338) may generate a result of the multiplication operation between a 4 (rows)×64 (columns, 8×8) matrix and a 64 (rows, 8×8)×j (columns) matrix. If the operation result of this multiplication is part of a multiplication operation for a larger matrix, processing unit 7 (338) may provide that result to the next processing unit (not shown) or the next data operation system (not shown) for further operations. In this configuration, data operation system 300 may be designed to support operations between various sizes of matrices. A more detailed explanation of the specific method for matrix operations in one data processing device is given below with reference to FIGS. 6 through 10. Also, a more detailed explanation of how to generate an index list used in the instruction sequence, based on the validity mask, is provided below with reference to FIGS. 12 to 14.

Although FIG. 4 shows eight data processing devices included in data operation system 300, this is not limiting; fewer than or equal to seven, or more than or equal to nine data processing devices may be included in data operation system 300. Also, for convenience of explanation of the operation method in FIG. 4, a 4 (rows)×8 (columns) left matrix and an 8 (rows)×j (columns) right matrix are used by way of example, but any matrices may be used as long as they satisfy the condition for matrix operations (e.g., for an inner product multiplication, the number of columns in the left matrix must be the same as the number of rows in the right matrix).

Figure 5:
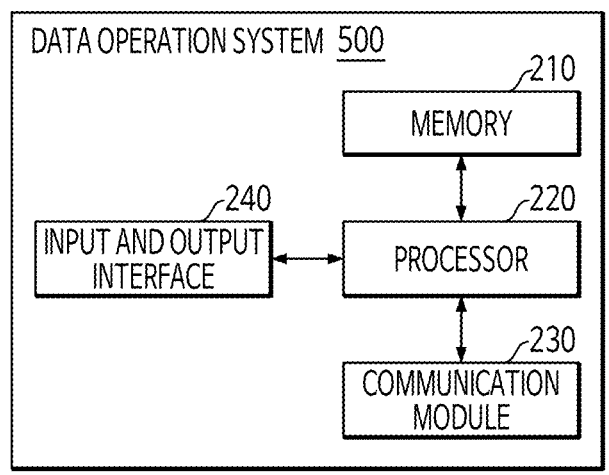
FIG. 5 is a diagram illustrating the configuration of a data operation system according to an embodiment of the present disclosure.

FIG. 5 is a diagram illustrating the configuration of a data operation system 500 according to an embodiment of the present disclosure. Referring to FIG. 5, the data operation system 500 may include a memory 210, a processor 220, a communication module 230, and an input/output interface 240. However, the configuration of the data operation system 500 is not limited thereto. According to various embodiments, the data operation system 500 may omit at least one of the above components and/or include at least one other component. Also, the storage module 310, the plurality of data load modules 321 to 328, and the plurality of processing units 331 to 338 included in the data operation system 500, described with reference to FIG. 4, may be included in the processor 220. For example, the processor 220 may include, in an array form, processing elements (PE) respectively corresponding to the plurality of processing units 331 to 338. Additionally or alternatively, each PE may include one processing unit, one data load module, and/or one storage module. Alternatively, the storage module 310 may be included in the memory 210, while the plurality of data load modules 321 to 328 and the plurality of processing units 331 to 338 are included in the processor 220.

The memory 210 may store various data used by at least one other component (e.g., the processor 220) of the data operation system 500. The data may include, for example, software (or a program) and input data or output data associated with that software (or program).

The memory 210 may include any non-transitory computer-readable recording medium. According to an embodiment, the memory 210 may include a permanent mass storage device such as a disk drive, a solid state drive (SSD), or a flash memory. As another example, a permanent mass storage device such as a read-only memory (ROM), an SSD, a flash memory, or a disk drive may be included in the data operation system 500 as a separate permanent storage device, distinct from the memory 210. Also, the memory 210 may store an operating system and at least one program code (e.g., instructions installed and executed by the data operation system 500). Although the memory 210 is shown as a single memory in FIG. 5 for convenience of explanation, the memory 210 may include a plurality of memories and/or buffers (e.g., registers).

Software components may be loaded into the memory 210 from a separate computer-readable recording medium. Such a separate computer-readable recording medium may include a recording medium that is directly connectable to the data operation system 500, for example, a floppy drive, a disk, a tape, a DVD/CD-ROM drive, a memory card, or the like. As another example, software components may be loaded into the memory 210 via the communication module 230, rather than from a computer-readable recording medium. For example, at least one program may be loaded into the memory 210 based on a computer program installed by files provided via file distribution from a developer or from an application installation file distribution system through the communication module 230.

The processor 220 may execute the software (or program) to control at least one other component (e.g., hardware or software components) of the data operation system 500 connected to the processor 220, and may perform various data processing or operations. According to an embodiment, as at least part of the data processing or operation, the processor 220 may receive instructions or data from another component (e.g., the communication module 230), load them into volatile memory, process these instructions or data in the volatile memory, and store the result data in non-volatile memory.

The processor 220 may be configured to process instructions of a computer program by performing basic arithmetic, logic, and input/output operations. Instructions may be provided by the memory 210 or the communication module 230 to the data operation system 500 or another external system. Although the processor 220 is shown as a single processor in FIG. 5 for convenience, the processor 220 may include a plurality of processors.

The communication module 230 may support the establishment of a direct (e.g., wired) or wireless communication channel between the data operation system 500 and an external electronic device, and may support communication through the established communication channel. For example, the communication module 230 may provide a configuration or function for enabling the data operation system 500 and an external electronic device (e.g., a user terminal or a cloud server) to communicate with each other via a network. For example, signals such as control signals, commands, or data provided under the control of the processor 220 of the data operation system 500 may be transmitted to an external electronic device via the communication module 230 and a network, and via the communication module of the external electronic device.

The input/output interface 240 may be means for interfacing with a device (not shown) for input or output connected to the data operation system 500 or included in the data operation system 500. For example, the input/output interface 240 may include at least one of a PCI express interface or an Ethernet interface, but is not limited thereto. Although the input/output interface 240 is shown as a separate component from the processor 220 in FIG. 5, this is not limiting, and the input/output interface 240 may be included in the processor 220.

FIGS. 6 through 9 sequentially illustrate how a data load module (e.g., the data load module 120 in FIG. 2) included in a data processing device (e.g., the data processing device 100 in FIG. 2) operates. That is, FIGS. 6 through 9 describe, from a hardware standpoint, how the data load module identifies the non-zero entries among the entries included in a matrix and generates an instruction sequence by using the identified non-zero entries, and provides the generated instruction sequence to a processing unit (e.g., the processing unit 130 in FIG. 2). In FIGS. 6 through 9, it is disclosed that entries are input and/or used for operations in order from the rightmost entry to the left direction, but this is not limiting; entries may be input and/or used for operations in order from the leftmost entry to the right direction.

Figure 6:
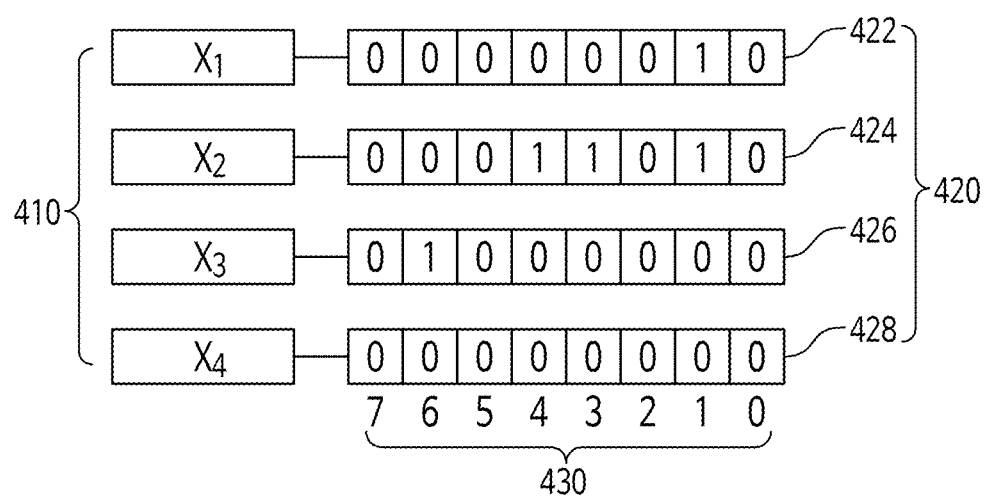
FIG. 6 is a diagram illustrating a validity mask corresponding to each of a plurality of sets of entries according to an embodiment of the present disclosure.

FIG. 6 is a diagram illustrating a validity mask 420 corresponding to each of a plurality of sets of entries in an embodiment of the present disclosure. A data load module (e.g., the data load module 120 in FIG. 2) may receive a plurality of entries 410 included in a first matrix (e.g., matrix 10 in FIG. 1) and position information associated with each of the entries 410, from a storage module (e.g., the storage module 110 in FIG. 2). Here, the first matrix may refer to an arbitrary matrix used in an operation between matrices. For example, the first matrix may be the left matrix used in a multiplication operation between matrices. Also, the position information may include information regarding which row and column each of the entries 410 occupies in the first matrix.

According to an embodiment, the data load module may generate a determination result as to whether each of the received plurality of entries is zero. Then, in accordance with the generated determination result, the data load module may generate the validity mask (validity mask) 420 indicating whether each of the plurality of received entries is zero. The validity mask 420 may include a first value (for example, 1) indicating that each of the plurality of entries is not zero, and a second value (for example, 0) indicating that each of the plurality of entries is zero. For example, as shown in FIG. 6, the first value may be represented by 1, and the second value by 0, but the opposite representation may also be used.

Among the plurality of sets of entries 410, the non-zero entries may be obtained from the validity mask 420. In the present disclosure, for example, some of the entries having the first value among the plurality of entries included in each of the first through the fourth rows may be identified. By using the identified entries and the position information corresponding to those entries, the instruction sequence may be generated. A specific method of generating the instruction sequence in this way is described in detail below with reference to FIGS. 7 through 9.

The data load module may group the received multiple sets of entries 410 in association with the multiple rows of the first matrix. For example, the data load module may divide multiple sets of entries (for example, a first set of entries through an n-th set of entries, where n is a natural number greater than or equal to 2) corresponding to the multiple rows of the first matrix into pipeline structures, and process each of the divided pipelines as a single thread. In the present disclosure, the four sets of entries ($X_1$, $X_2$, $X_3$, $X_4$) included in the first matrix may each be divided into pipeline structures. Here, each of the first through fourth sets of entries ($X_1$, $X_2$, $X_3$, $X_4$) may include at least one entry; in the present disclosure, it may include 8 entries, but is not limited thereto. For instance, the first set of entries $X_1$ may correspond to the first row vector of the first matrix, the second set of entries $X_2$ may correspond to the second row vector of the first matrix, the third set of entries $X_3$ may correspond to the third row vector of the first matrix, and the fourth set of entries $X_4$ may correspond to the fourth row vector of the first matrix, each forming one pipeline structure and being processed as one thread.

Furthermore, if the first matrix (for example, a 4 (rows)×8 (columns) matrix) is part of a matrix having a larger size (for example, a 4 (rows)×64 (columns) matrix) than the first matrix, then the position information may include information indicating which part of the larger matrix the plurality of entries 410 of the first matrix corresponds to. According to an embodiment, if the first matrix is a 4 (rows)×8 (columns) matrix that constitutes the first four rows of a 4 (rows)×64 (columns) matrix, then a numeric value or a flag (e.g., 0 or 1) indicating the first four rows may be stored in association with each of the four sets of entries $X_1$, $X_2$, $X_3$, $X_4$ included in the first matrix. For example, this numeric value (not shown) may be connected to each of the four sets of entries $X_1$, $X_2$, $X_3$, $X_4$ included in the first matrix and provided to the data load module.

The data load module may generate an index for each of the sets of entries $X_1$, $X_2$, $X_3$, $X_4$ by using the position information. Here, the index may include information on which column number is associated with each entry among multiple entries included in each row of the matrix. As shown in FIG. 6, the data load module may, for example, assign index numbers in a predetermined direction from the rightmost entry to the left, but may also assign the numbers in the reverse order. Also, in each of the four sets of entries $X_1$, $X_2$, $X_3$, $X_4$ of the first matrix, entries located in the same column position may be associated with the same index.

The validity mask 420 may be classified according to pipeline structures corresponding to each of the four sets of entries $X_1$, $X_2$, $X_3$, $X_4$. For example, the validity mask 420 may include a first validity mask 422 corresponding to the first set of entries, a second validity mask 424 corresponding to the second set of entries, a third validity mask 426 corresponding to the third set of entries, and a fourth validity mask 428 corresponding to the fourth set of entries.

The data load module may associate indices 430 with the validity mask 420. For example, if, among the first set of entries $X_1$ included in the first matrix, only the entry at index 1 is determined to have a non-zero value, then the first validity mask 422 corresponding to the first set of entries may include the first value (for example, 1) for the entry corresponding to index 1, and the second value (for example, 0) for the entry corresponding to the remaining indices. Similarly, if, among the second set of entries $X_2$ included in the first matrix, only the entries at indices 1, 3, and 4 are determined to have non-zero values, then the second validity mask 424 may include the first value for the entries corresponding to indices 1, 3, and 4, and the second value for the entries corresponding to the other indices. Moreover, if, among the third set of entries included in the first matrix, only the entry at index 6 is determined to have a non-zero value, then the third validity mask 426 may include the first value for the entry corresponding to index 6, and the second value for the entries corresponding to the other indices. Also, if all entries in the fourth set of entries included in the first matrix are determined to be zero, then the fourth validity mask 428 may include the second value for all indices.

Figure 7:
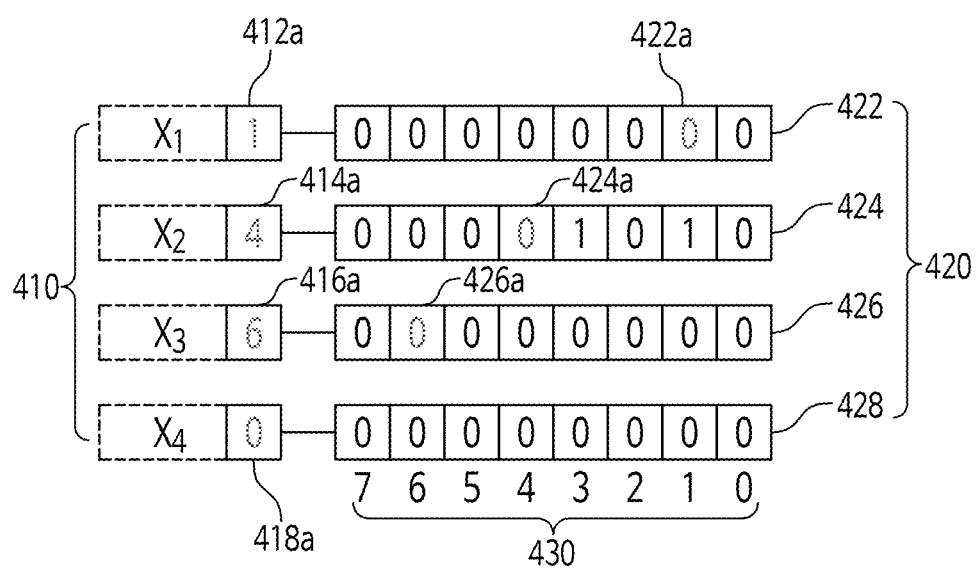
FIG. 7 is a diagram for explaining a method of processing a last entry in a predetermined direction, which is associated with a first value of a validity mask, in each of a plurality of sets of entries according to an embodiment of the present disclosure.

FIG. 7 is a diagram for explaining a method of processing the last entry, which is associated with the first value of the validity mask in the predetermined direction, in each of the sets of entries $X_1$, $X_2$, $X_3$, $X_4$ according to an embodiment of the present disclosure. FIG. 7 illustrates a processing method performed after generating the validity mask 420 corresponding to each of the sets of entries $X_1$, $X_2$, $X_3$, $X_4$, which was described in FIG. 6. Thus, in FIG. 7, the configuration described in FIG. 6 may be omitted.

As shown in FIG. 7, the numbers of indices 430 associated with the validity mask 422, 424, 426, 428 corresponding to the sets of entries $X_1$, $X_2$, $X_3$, $X_4$ may be set according to the predetermined direction. Here, an entry associated with a lower-numbered index may be input to the processing unit (e.g., the processing unit 130 in FIG. 2) before an entry associated with a higher-numbered index.

The data load module may determine the last entry, which is associated with the first value of the validity mask, in the predetermined direction, in each of the first through fourth sets of entries $X_1$, $X_2$, $X_3$, $X_4$. As shown in the validity mask 420 of FIG. 6, the data load module may determine that, in the first set of entries, the entry at index 1 is the last entry associated with the first value. Similarly, the data load module may determine that, in the second set of entries, the entry at index 4 is the last entry associated with the first value; that, in the third set of entries, the entry at index 6 is the last entry associated with the first value; and that, in the fourth set of entries, all indices have the second value.

Then, the data load module may change the first value of the validity mask associated with the determined last entry to the second value in each of the first through fourth sets of entries $X_1$, $X_2$, $X_3$, $X_4$. As shown in the validity mask 420 of FIG. 7, the data load module may change the first value of the last entry 422a in the validity mask 422 corresponding to the first set of entries to the second value. Similarly, the data load module may change the first value of the last entry 424a in the validity mask 424 corresponding to the second set of entries to the second value, and may change the first value of the last entry 426a in the validity mask 426 corresponding to the third set of entries to the second value. Because all indices in the validity mask 428 corresponding to the fourth set of entries have the second value, no conversion is performed from the first value to the second value.

Figure 12:
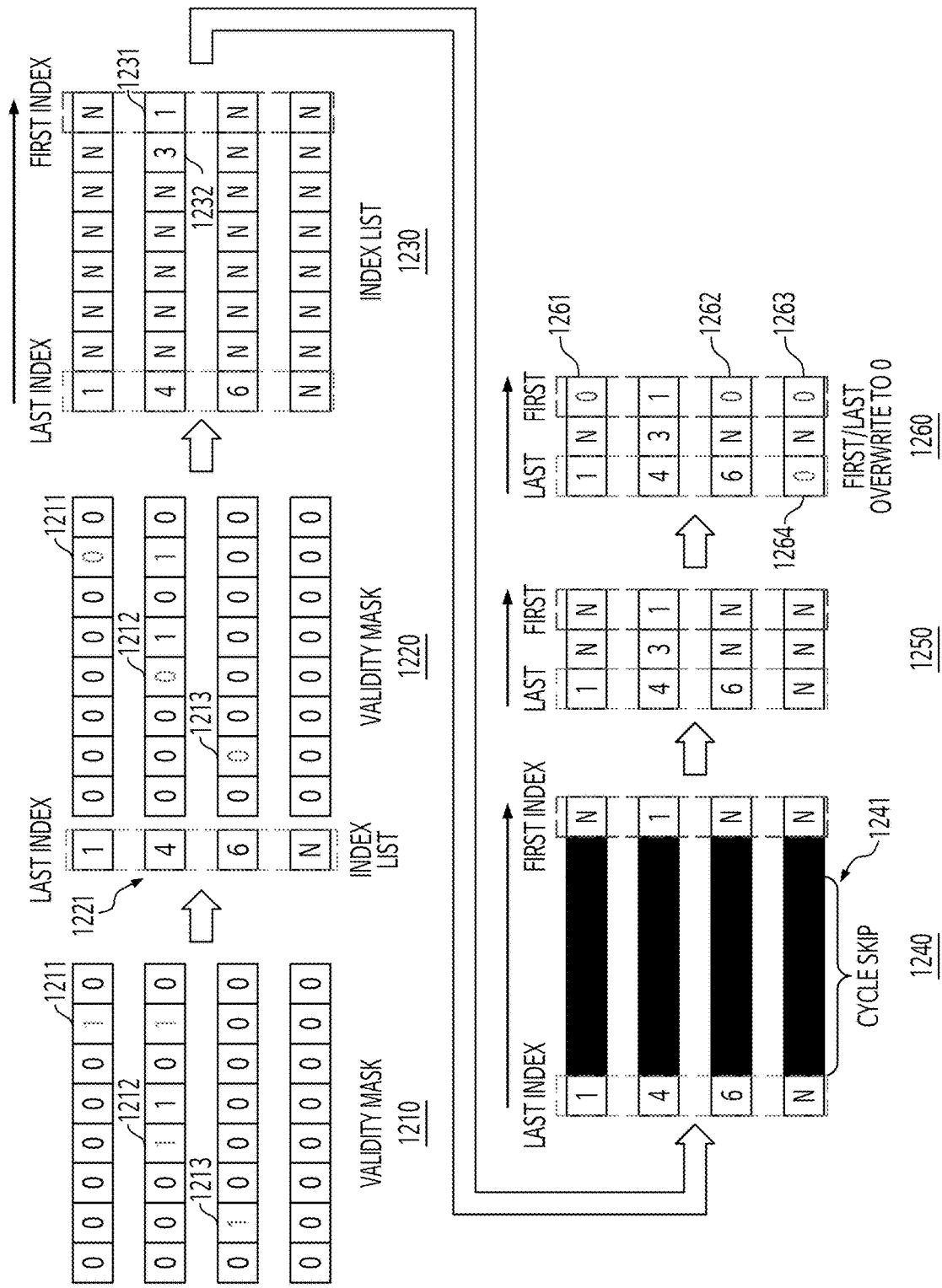
Figure 13:
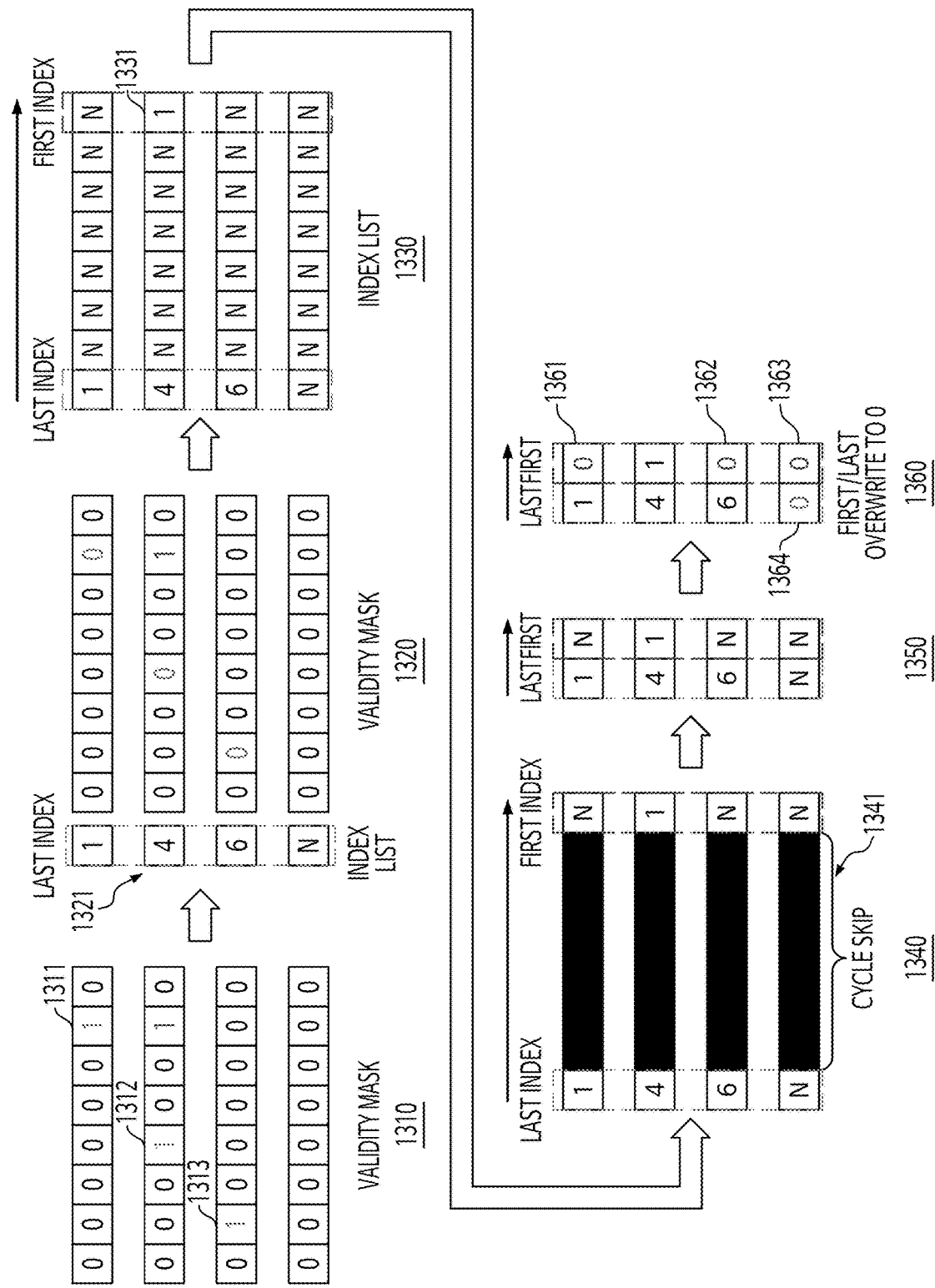

Further, the data load module may store the index associated with the determined last entry in association with each of the first through fourth sets of entries $X_1$, $X_2$, $X_3$, $X_4$. For example, first set of entries $X_1$ may be stored in association with index 1 (412a), which is linked to the last entry of that set of entries. Similarly, second set of entries $X_2$ may be stored in association with index 4 (414a), and third set of entries $X_3$ may be stored in association with index 6 (416a). Because all entries included in the fourth set of entries $X_4$ have the second value, the first entry to be input to the processing unit may be associated with index 0 (418a). As shown in FIG. 7, each of the indices associated with the last entry in each of the first through fourth sets of entries $X_1$, $X_2$, $X_3$, $X_4$ may be stored following the first through fourth sets of entries $X_1$, $X_2$, $X_3$, $X_4$, but this is not limiting. For example, as shown in FIGS. 12 to 14, these indices associated with the last entry in each of the first through fourth sets of entries $X_1$, $X_2$, $X_3$, $X_4$ may be stored as the last index in an index list.

Figure 8:
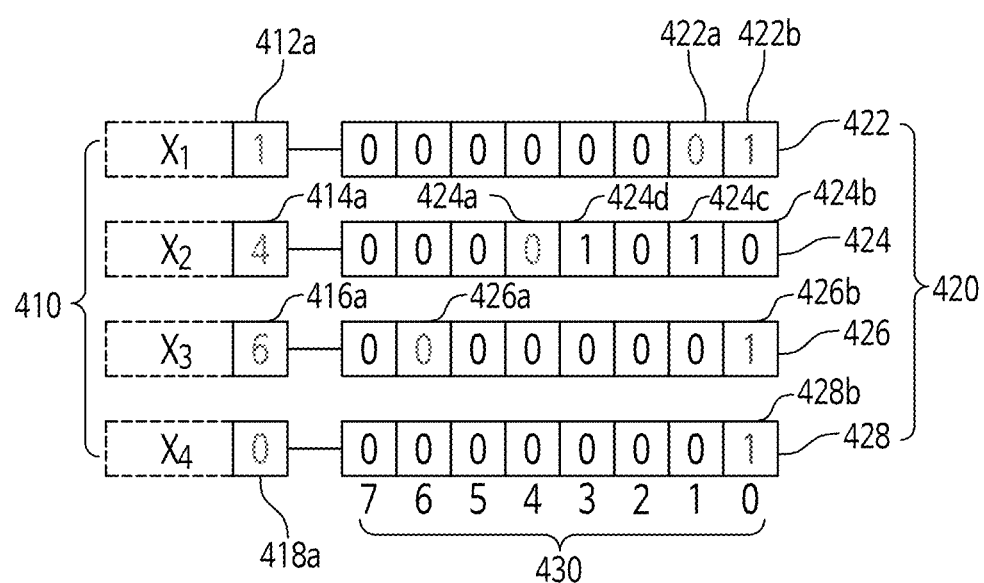
FIG. 8 is a diagram for explaining a method of processing the validity mask value associated with the first entry in the predetermined direction in each of a plurality of sets of entries according to an embodiment of the present disclosure.

FIG. 8 is a diagram for explaining how to process the value of the validity mask associated with the first entry in the predetermined direction in each of the sets of entries $X_1$, $X_2$, $X_3$, $X_4$ according to an embodiment of the present disclosure. FIG. 8 illustrates a processing method performed after generating the changed validity mask value for the last entry in each of the sets of entries $X_1$, $X_2$, $X_3$, $X_4$, described in FIG. 7. Therefore, the configurations described in FIGS. 6 and 7 may be omitted in FIG. 8.

As described with respect to FIG. 7, the data load module (e.g., the data load module 120 in FIG. 2) may change the first value of the validity mask of the last entry in each of the sets of entries $X_1$, $X_2$, $X_3$, $X_4$ to the second value, and then determine whether all entries in each of the sets $X_1$, $X_2$, $X_3$, $X_4$ have the second value for the validity mask. If all entries in each of the sets $X_1$, $X_2$, $X_3$, $X_4$ are determined to have the second value of the validity mask, the data load module may change the second value of the validity mask for the first entry in the predetermined direction to the first value in each of the sets $X_1$, $X_2$, $X_3$, $X_4$. For example, as shown in FIG. 7, the data load module may determine that all validity mask values are the second value in first set $X_1$, third set $X_3$, and fourth set $X_4$. Accordingly, the data load module may change the second value of index 0 (422b) in the validity mask 422 corresponding to the first set of entries $X_1$ to the first value. Similarly, the data load module may change the second value of index 0 (426b) in the validity mask 426 corresponding to the third set of entries $X_3$ to the first value, and the second value of index 0 (428b) in the validity mask 428 corresponding to the fourth set of entries $X_4$ to the first value. On the other hand, because not all indices in the validity mask 424 corresponding to the second set of entries $X_2$ have the second value, the data load module does not change the second value of index 0 (424b) in the validity mask 424 to the first value.

In the present disclosure, if the data load module determines that all entries in each of the sets $X_1$, $X_2$, $X_3$, $X_4$ have the second value for the validity mask, it may change the value of the validity mask associated with the first entry in each set $X_1$, $X_2$, $X_3$, $X_4$ in the predetermined direction to the first value. The first entries associated with these changed validity mask values may be included in the first index (index 0) when generating the index list for the instruction sequence, as described in FIG. 9. Furthermore, from a hardware standpoint, these first entries may be represented as entries that do not actually require computation, but instead perform a sub-instruction to receive a previous operation result from a previous processing unit.

Figure 9:
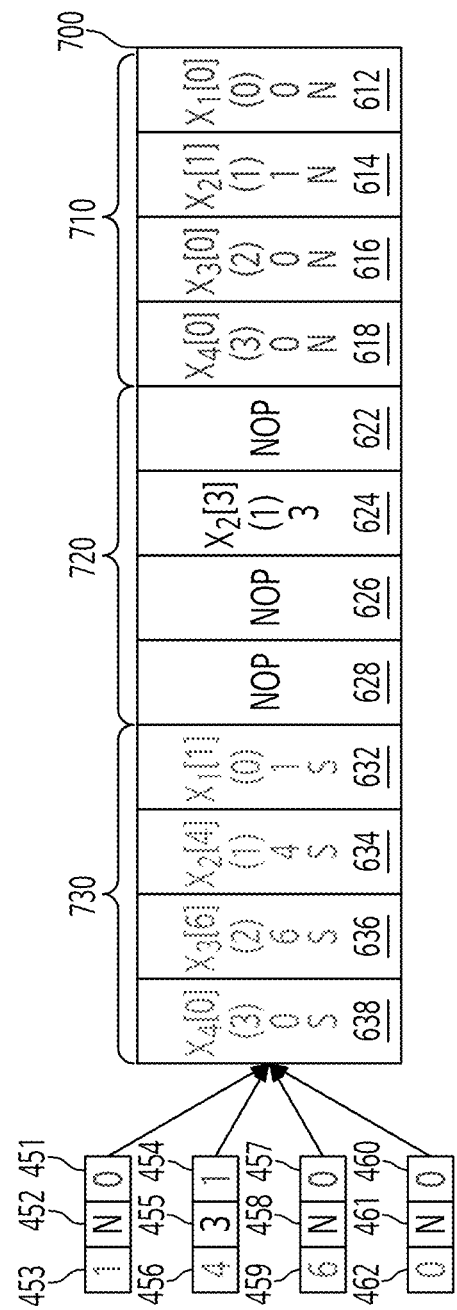
FIG. 9 is a diagram for explaining a method of generating an instruction sequence according to an embodiment of the present disclosure.

FIG. 9 is a diagram illustrating a method of generating an instruction sequence according to an embodiment of the present disclosure. FIG. 9 illustrates a method of generating an instruction sequence after the value of the validity mask for the first entry in the predetermined direction in each of the sets $X_1$, $X_2$, $X_3$, $X_4$ is processed, as described in FIG. 8. Therefore, the configurations described in FIGS. 6 through 8 may be omitted in FIG. 9.

An instruction sequence 700 may include one or more sets of instructions. According to one embodiment, the data load module (e.g., the data load module 120 in FIG. 2) may calculate how many entries have the first value in each of the sets $X_1$, $X_2$, $X_3$, $X_4$ of the first matrix, as described in FIG. 6, and may generate as many instruction sets as the greatest among these calculated numbers as the instruction sequence 700. For example, the data load module may determine that among the components of the first set to the fourth set ($X_1$, $X_2$, $X_3$, $X_4$), three entries in the second set $X_2$ (see FIG. 6) have the first value in the validity mask, which is the largest among the four sets, and thus generate three sets of instructions 710, 720, 730 for the instruction sequence 700. Here, the number of entries in the second set $X_2$ that initially had the first value in the validity mask may be the same as the number of non-zero entries in $X_2$.

The data load module may associate at least a portion of the plurality of instructions included in the instruction sequence with an index, forming an index list. Each of indices 451, 452, 453, 454, 455, 456, 457, 458, 459, 460, 461, 462 corresponding to $X_1$, $X_2$, $X_3$, $X_4$ may be used when generating an instruction for each entry. For example, as illustrated in FIG. 9, each of the instructions (other than NOP instructions) may include an index associated with the corresponding entry. Accordingly, the indices 451 to 462 may be arranged as part of each thread corresponding to the first through fourth sets of entries $X_1$, $X_2$, $X_3$, $X_4$, in association with the instruction sets 710, 720, 730. For instance, instructions 612, 622, 632 associated with the indices 451, 452, 453 ($X_1$) may operate as the first thread, instructions 614, 624, 634 associated with indices 454, 455, 456 ($X_2$) may operate as the second thread, instructions 616, 626, 636 associated with the indices 457, 458, 459 ($X_3$) may operate as the third thread, and instructions 618, 628, 638 associated with indices 460, 461, 462 ($X_4$) may operate as the fourth thread.

The data load module may identify or determine the first entry in the predetermined direction that is associated with the first value of the validity mask, in each of the first through fourth sets $X_1$, $X_2$, $X_3$, $X_4$. In the present disclosure, as illustrated in FIG. 8, the first entry associated with the first value of the validity mask in $X_1$ may be the entry at the index 0 (451), the first entry in $X_2$ may be the entry at the index 1 (454), the first entry in $X_3$ may be the entry at the index 0 (457), and the first entry in $X_4$ may be the entry at the index 0 (460).

The data load module may generate a first set of instructions 710 that includes instructions associated with the first entries determined in each of the sets $X_1$, $X_2$, $X_3$, $X_4$. The first set of instructions 710 may include a 1-1 instruction 612 associated with the entry at index 0 in $X_1$, a 1-2 instruction 614 associated with the entry at index 1 in $X_2$, a 1-3 instruction 616 associated with the entry at index 0 in $X_3$, and a 1-4 instruction 618 associated with the entry at index 0 in $X_4$. Each of instructions 612, 614, 616, 618 may include a sub-instruction to receive the previous operation result from a previous processing unit under the systolic array structure described in FIG. 4, in accordance with the order of operations of the systolic array. For example, as shown in FIG. 9, each of instructions 612, 614, 616, 618 includes "N (NORTH)," indicating that when these instructions are transmitted to the processing unit (e.g., the processing unit 130 in FIG. 2), a sub-instruction is performed to receive the previous result from the previous processing unit. The letter "N" included in the instruction is merely one example for indicating that this sub-instruction is included; any arbitrary digit, letter, or combination thereof may be used to represent or characterize such a sub-instruction.

Next, the data load module may identify a second entry having the first value of the validity mask in the predetermined direction among each of the first through fourth sets $X_1$, $X_2$, $X_3$, $X_4$, and may generate a second set of instructions 720 that includes instructions associated with the identified second entries in each set $X_1$, $X_2$, $X_3$, $X_4$. The generated second set of instructions 720 may be included in the instruction sequence 700 as a set of instructions to be executed after the first set of instructions 710.

As shown in FIG. 8, among the first through fourth sets of entries $X_1$, $X_2$, $X_3$, $X_4$, only $X_2$ has an entry at the index 3 (455) that has the first value of the validity mask for the second entry. Accordingly, the data load module may generate a 2-3 instruction 624 for the entry at index 3 in $X_2$.

Also, as shown in FIGS. 8, $X_1$, $X_3$, and $X_4$ each have no second entry with the first value of the validity mask. In other words, after generating the first set of instructions 710, it may be identified that one or more subsequent entries in the predetermined direction in $X_1$, $X_3$, and $X_4$ all have the second value. As indicated in FIG. 9, the second set of instructions for indices 452, 458, 461 is marked "N (No)." In this case, the data load module may generate instructions 622, 626, 628 of the second set of instructions 720 for $X_1$, $X_3$, and $X_4$ so that each such instruction is NOP (No Operation). Because these NOP operations are included in the set of instructions, even though the time spent on the operation cannot be reduced, resource consumption such as power consumption of the processing unit can be reduced.

After generating the second set of instructions 720, the data load module may generate an m-th set of instructions different from the second set of instructions, until there are no further entries associated with the first value of the validity mask in the predetermined direction in each of the first through fourth sets of entries $X_1$, $X_2$, $X_3$, $X_4$. Any such newly generated set of instructions is included in the instruction sequence 700 as a set of instructions to be executed after the second set of instructions 720. In the present disclosure, however, as shown in FIG. 8, after the second set of instructions 720 is generated, it is found that $X_2$ has no further entry having the first value of the validity mask in the predetermined direction. Hence, the data load module may not generate any further sets of instructions. If $X_2$ had a further entry identified in the predetermined direction, a set of instructions between the second set 720 and a third set could be generated in the same or similar manner as the second set of instructions.

Next, as discussed in FIGS. 7 and 8, the data load module may acquire indices 412a, 414a, 416a, 418a associated with the last entries that had the first value of the validity mask, stored in association with each of the first through fourth sets of entries $X_1$, $X_2$, $X_3$, $X_4$. As shown in FIG. 9, these indices may be associated with the third set of instructions 730 and may be arranged as indices 453, 456, 459, and 462 in each of the first through fourth threads corresponding to the sets $X_1$, $X_2$, $X_3$, $X_4$, respectively.

The data load module may include the third set of instructions 730 that includes instructions 632, 634, 636, 638 associated with indices 453, 456, 459, 462. The third set of instructions 730 may include a 3-1 instruction 632 corresponding to index 1 of $X_1$, a 3-2 instruction 634 corresponding to index 4 of $X_2$, a 3-3 instruction 636 corresponding to index 6 of $X_3$, and a 3-4 instruction 638 corresponding to index 0 of $X_4$. Each of instructions 632, 634, 636, 638 may include a sub-instruction to transmit the operation result to a next processing unit, in accordance with the order of operations in the systolic array structure described in FIG. 4. For example, as shown in FIG. 9, each of instructions 632, 634, 636, 638 includes "S (SOUTH)," indicating that when the instruction is transmitted to the processing unit, a sub-instruction is executed to send the operation result to the next processing unit. The letter "S" included in the instruction is merely one example to indicate that this sub-instruction is included; any arbitrary digit, letter, or combination thereof may be used to represent or characterize such a sub-instruction. The generated third set of instructions 730 may be included in the instruction sequence 700 as the last set of instructions executed.

According to an embodiment, if only two or fewer entries in each of $X_1$, $X_2$, $X_3$, $X_4$ have non-zero values, the second set of instructions 720 may be excluded from the instruction sequence 700. An example of this is described below with reference to FIG. 13.

According to another embodiment, if only one or fewer entries in each of $X_1$, $X_2$, $X_3$, $X_4$ have a non-zero value (i.e., at most one entry is non-zero or all are zero), the instruction sequence 700 may include only one set of instructions. In this case, each instruction in that one set of instructions may include at least a sub-instruction to receive an operation result from a previous processing unit and a sub-instruction to transmit the operation result to the next processing unit, as well as a sub-instruction to perform an operation. An example of this is described below with reference to FIG. 14.

Also, multiplication between matrices (for example, an inner product) may be performed by multiplying each entry in a row of the left matrix by each corresponding entry in a column of the right matrix, in index order, and then adding the results of the multiplications. Here, the index associated with an entry of the left matrix may match the index of an entry of the right matrix in the order. In one embodiment, the processing unit may perform the multiplication operation for one instruction by using an index included in that instruction, i.e., multiplying the entry associated with that index in the left matrix by the entry associated with the same index in each column included in the right matrix, which was pre-loaded into the processing unit, and then adding the products. The entries in the right matrix that are multiplied may be those columns whose indices match the index included in the instruction. In this processing unit structure, the result values computed in each thread for one or more instructions may be stored in a register or another storage module within the processing unit for the addition of one or more multiplication results in the next instruction in the thread. Also, the final operation result computed by, for example, the last instruction in each of the four threads of the first matrix ($X_1$, $X_2$, $X_3$) in the processing unit may be provided to a next processing unit under a systolic array structure, or may be output as a final result value.

In addition, each of the one or more sets of instructions (710, 720, 730) may include four instructions. Because four sets of entries were loaded in FIGS. 6 through 9, each of the three instruction sets (710, 720, 730) may include four instructions. Also, each of the four instructions included in each of the one or more instruction sets (710, 720, 730) may include four sub-instructions for at least one of operation or communication, according to the processing unit's hardware structure. In other words, the number (e.g., 4) of instructions included in each instruction set may be the same as the number (e.g., 4) of sub-instructions included in each of the four instructions. A detailed description of the sub-instructions included in each instruction is given below with reference to FIG. 10.

As shown in FIG. 9, in instruction sequence 700, the 1-1 instruction 612 may be provided to the processing unit first, followed by the other instructions in a leftward direction, and the 3-4 instruction 638 may be input last. Each instruction may be provided to the processing unit according to the system clock of the data load module. Additionally or alternatively, each instruction may be provided according to any clock signal delivered to the processing unit.

In this configuration, when instructions are executed through thread-by-thread interleaving corresponding to each of the four sets of entries $X_1$, $X_2$, $X_3$, $X_4$, each thread's instructions may be executed without delay. For example, in the second thread corresponding to $X_2$, after the 1-2 instruction 614 is provided to the processing unit, the 2-2 instruction 624 may be executed four cycles later, and the 3-2 instruction 634 may be executed four cycles after that. Because each instruction includes four sub-instructions in the processing unit's hardware structure, the 2-2 instruction 624 in the second thread may use, without delay, the operation result of the 1-2 instruction 614 in the same thread, and similarly, the 3-2 instruction 634 may use, without delay, the result of the 2-2 instruction 624. This operation is likewise applicable to the first, third, and fourth threads.

In the present disclosure, due to the hardware structure, each instruction includes four sub-instructions, and thus the first matrix includes four sets of entries corresponding to the first through fourth threads. However, this is not limiting; depending on modifications to the hardware structure, the number of sub-instructions included in each instruction may be three or fewer, or five or more, and in such a case, the number of sets of entries (e.g., rows or columns) in the first matrix that are assigned to one processing unit may be designed to match the number of sub-instructions.

Furthermore, although the instructions included in each of the three instruction sets 710, 720, 730 are arranged in the order from thread 1 to thread 4, this is not limiting; if the order of threads in each of the three instruction sets 710, 720, 730 is the same, the instructions included in each of the sets of instructions 710, 720, 730 may follow any arbitrary order.

Figure 10:
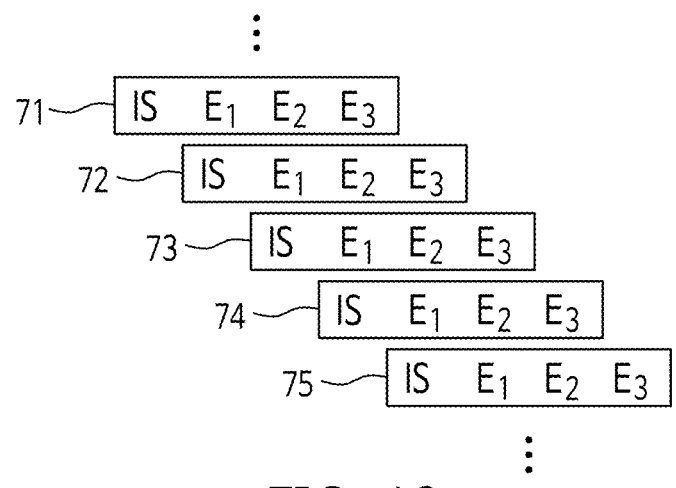
FIG. 10 is a diagram for explaining how each of the instructions included in the instruction sequence is executed in a processing unit according to an embodiment of the present disclosure.

FIG. 10 is a diagram for explaining how each of the instructions included in the instruction sequence is performed in the processing unit according to an embodiment of the present disclosure. Each of instructions 71, 72, 73, 74, 75 may include four sub-instructions IS, E1, E2, E3. Under sub-instruction IS, the processing unit (e.g., the processing unit 130 in FIG. 2) may fetch or receive an instruction from the data load module (e.g., the data load module 120 in FIG. 2), and may receive an entry of the left matrix from the data load module for a multiplication operation between entries (e.g., an inner product). Here, each set of entries included in one or more rows of the left matrix may be associated with an index, as discussed with reference to FIGS. 6 to 8. Under sub-instruction IS, the processing unit may also receive, from a storage medium included in the processing unit and among the entries of one or more columns in the right matrix, an entry having the same index as the entry of the left matrix, if that right matrix entry is pre-stored in the processing unit's register. In addition, under sub-instruction IS, the processing unit may receive a multiplication result value computed by the same thread's previous instruction from the register in the processing unit, or may receive a previous operation result from the previous processing unit.

Then, under sub-instruction E1, the processing unit may generate the product of the received entry from the left matrix and the entry from the right matrix having the same index, using a multiplier included in the processing unit. The product thus generated may be stored in a register within the processing unit.

Then, under sub-instruction E2, the processing unit may use an adder included in the processing unit to add the multiplication result by previous instruction in the same thread and/or the previous operation result from a previous processing unit to the current multiplication result computed by the processing unit. Under sub-instruction E3, the processing unit may store the addition result in the register in the processing unit, transmit it to a next processing unit, or output it as a final result value, according to the order of operations under the systolic array structure.

In FIG. 9, as described, each of the four sets of entries corresponding to the four rows included in the left matrix operates as a separate thread. An instruction set includes four instructions, and each of these instructions can be performed in a separate thread. Under this configuration, the instruction 71 and an instruction 75 may be included in the same thread. As shown in FIG. 10, because sub-instruction IS of instruction 75 starts at the time at which sub-instruction E3 of the instruction 71 ends, the result of the instruction 71's sub-instruction E3 can be received without delay, allowing sub-instruction IS in instruction 75 to be performed without delay.

Although in the present disclosure it is described that one instruction includes four sub-instructions, based on the processing unit's hardware structure and/or operations, this is not limiting; in other implementations, three or fewer or five or more sub-instructions may be generated depending on changes in the processing unit's hardware structure and/or operations.

Also, in the present disclosure, while sub-instructions that are performed under an instruction are described as IS, E1, E2, and E3, this is not limiting; a portion of the operations described for one sub-instruction may be carried out in a different sub-instruction.

Moreover, although the four sub-instructions are denoted as IS, E1, E2, and E3 in the present disclosure, any type of notation that can represent or characterize the contents of the instruction may be used.

Figure 11:
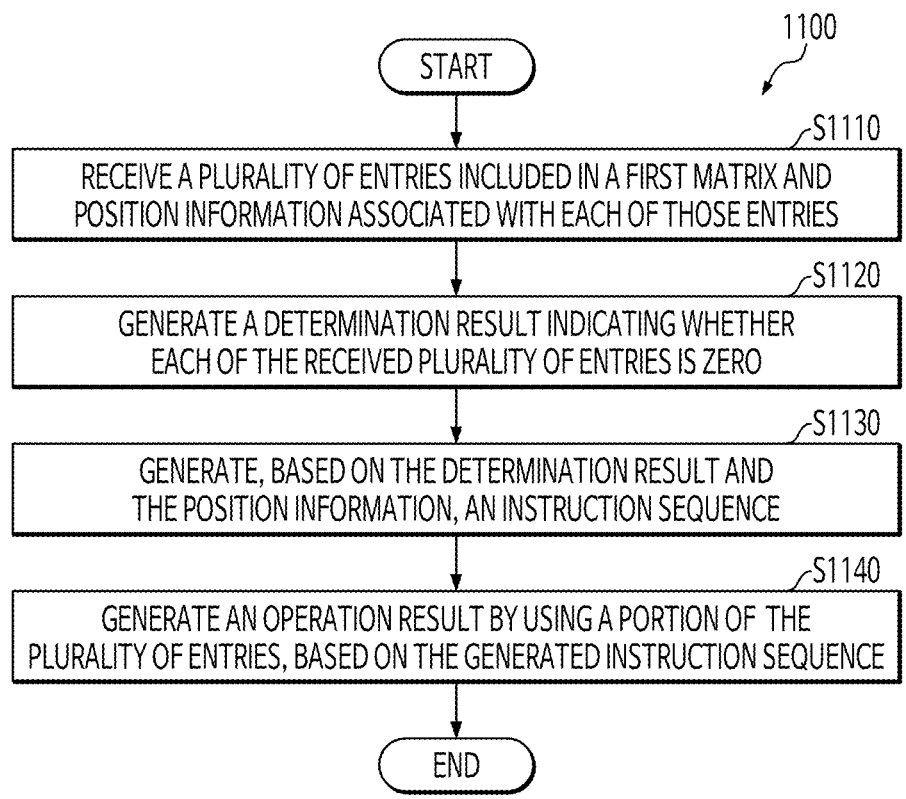
FIG. 11 is a diagram illustrating a data operation method according to an embodiment of the present disclosure.

FIG. 11 is a diagram illustrating a data operation method 1110 according to an embodiment of the present disclosure. Referring to FIG. 11, at step S1110, the data load module (e.g., the data load module 120 in FIG. 2) of the data processing device (e.g., the data processing device 100 in FIG. 1) may receive a plurality of entries included in a first matrix and position information associated with each of those entries. Here, the first matrix may be a sparse matrix.

At step S1120, the data load module may generate a determination result indicating whether each of the received plurality of entries is zero. Then, at step S1130, based on the determination result and the position information, the data load module may generate an instruction sequence.

According to an embodiment, the data load module may generate a validity mask indicating whether each of the received plurality of entries is zero, in accordance with the determination result. Here, the validity mask may include a first value indicating that each of the plurality of entries is not zero and a second value indicating that each is zero. The data load module may then determine which of the plurality of entries are non-zero by using the generated validity mask. By using the determined entries and their corresponding position information, the instruction sequence may be generated. The generated instruction sequence may be provided from the data load module to a processing unit (e.g., the processing unit 130 in FIG. 2). At step S1140, the processing unit may generate an operation result by using a portion of the plurality of entries, based on the generated instruction sequence.

The flowchart and descriptions above are merely examples; in some embodiments, different implementations may be possible. For example, in some embodiments, the sequence of steps may be changed, a portion of steps may be repeated, a portion of steps may be omitted, or additional steps may be included.

FIGS. 12 to 14 illustrate how to generate an index list used in generating an instruction sequence, by using a validity mask, according to various embodiments of the present disclosure. Specifically, FIG. 12 shows how to generate an index list for the sets $X_1, X_2, X_3, X_4$ of the matrix described in FIGS. 6 to 9. FIG. 13 shows how to generate an index list when only two or fewer entries in each of $X_1, X_2, X_3, X_4$ are non-zero. FIG. 14 shows how to generate an index list when only one or fewer entries in each of $X_1, X_2, X_3, X_4$ are non-zero. In each of FIGS. 12 to 14, six operations are illustrated for creating the index list used to generate the instruction sequence. However, this is not limiting; two or more operations may be combined into one, or at least one operation may be subdivided into two or more operations. Also, in FIGS. 12 to 14, to avoid repetition, the configurations described in FIGS. 6 to 9 may be omitted.

In the first operation 1210 of FIG. 12, a validity mask identical to the validity mask described in FIGS. 6 to 9 for the sets $X_1$, $X_2$, $X_3$, $X_4$ in the matrix may be generated. Here, the data load module (e.g., the data load module 120 in FIG. 2) may determine last entries 1211, 1212, 1213 in the predetermined direction associated with the first value of the validity mask in each of the sets $X_1$, $X_2$, $X_3$, $X_4$. Then, as shown at a second operation 1220 of FIG. 12, the data load module may change the first value of the last entries 1211, 1212, 1213 to the second value (for example, 0). The data load module may store information about the indices associated with the last entries 1211, 1212, 1213 in an index list 1221. Because all entries in $X_4$ are 0, the validity mask associated with $X_4$ may be the second value, so it may be determined that there is no last entry associated with the first value. In this case, unlike FIG. 7, the index associated with the last entry of $X_4$ may be stored as N (No) rather than 0.

Then, using the validity mask described in the second operation 1220 of FIG. 12, the data load module may, at a third operation 1230 of FIG. 12, generate an index list that includes information about the indices associated with the last entries 1211, 1212, 1213. Among $X_1$, $X_2$, $X_3$, $X_4$, only $X_2$ has the first value for indices 1 and 3 in the validity mask, so the data load module may generate an index list that includes information about the indices in $X_2$, in order of the indices with the first value. For example, index 1 (1231) may be stored first for $X_2$ in the index list, followed by index 3 (1232) for $X_2$. Because all other sets of entries have a validity mask of the second value (i.e., all zero entries), the data load module may store N for the indices of those entries.

Then, as shown in a fourth operation 1240 of FIG. 12, the data load module may determine that in all of $X_1$, $X_2$, $X_3$, $X_4$, from indices 3 to 7, all entries are marked N, so the instruction set corresponding to indices 3 through 7 may not be generated. Accordingly, the data load module may skip a cycle 1241 corresponding to indices 3 through 7. As shown at the fifth operation 1250 of FIG. 12, the data load module may thus generate an index list from which the cycle corresponding to indices 3 through 7 is deleted. Then, as shown at the sixth operation 1260 of FIG. 12, the data load module may change each of N (1261, 1262, 1263) in the first index of $X_1$, $X_2$, $X_3$, $X_4$ and N (1264) in the last index in the index list to 0. Because the instruction corresponding to the first index must at least include a sub-instruction to receive a previous operation result, and the instruction corresponding to the last index must at least include a sub-instruction to transmit the operation result to the next processing unit, the N for the first and last indices may be changed to 0, whereas the N for an index between the first and last indices need not be changed. As described above with reference to FIG. 9, the data load module may generate an instruction sequence by creating NOP (No Operation) for each index marked N between the first and last indices, and creating an instruction for each index not marked N.

Comparing a first operation 1310 in FIG. 13 to a first operation 1210 in FIG. 12, it may be determined that only two non-zero entries exist in $X_2$. That is, in each of $X_1$, $X_2$, $X_3$, $X_4$, the data load module may determine last entries 1311, 1312, 1313 in the predetermined direction associated with the first value of the validity mask. As shown at a second operation 1320 of FIG. 13, the data load module may change the first value of the last entries 1311, 1312, 1313 to the second value. The data load module may store the index information for the last entries 1311, 1312, 1313 as an index list 1321. Because all entries in $X_4$ are 0, the validity mask associated with $X_4$ is the second value, so there is no last entry with the first value. In this case, unlike FIG. 7, the index associated with the last entry of $X_4$ may be stored as N (No) rather than 0.

Then, using the validity mask changed at the second operation 1320 of FIG. 13, the data load module may generate, as shown at a third operation 1330 of FIG. 13, an index list containing information about the indices associated with the last entries 1311, 1312, 1313. Among $X_1$, $X_2$, $X_3$, $X_4$, only $X_2$ has the first value of the validity mask at index 1, so the data load module may generate an index list containing information about index 1, in index order, for $X_2$. For example, index 1 (1331) may be stored at the first index associated with the second set of entries ($X_2$) in the index list. In addition, since all the remaining entries, excluding the above, have values of zero, the data load module may store N at the indices corresponding to those entries, based on a validity mask in which all bits have a second value.

Then, as shown at a fourth operation 1340 of FIG. 13, the data load module may determine that in all of $X_1$, $X_2$, $X_3$, $X_4$, from indices 2 to 7, all entries are marked N, so the instruction set corresponding to indices 2 to 7 may not be generated. Therefore, the data load module may skip a cycle 1341 corresponding to indices 2 to 7. As shown at a fifth operation 1350 of FIG. 13, the data load module may thus generate an index list from which the cycle corresponding to indices 2 through 7 is deleted. Then, as shown at a sixth operation 1360 of FIG. 13, the data load module may change each of N (1361, 1362, 1363) in the first index of $X_1$, $X_2$, $X_3$, $X_4$ and N (1364) in the last index in the index list to 0. Because the instruction for the first index must at least include a sub-instruction to receive a previous operation result, and the instruction for the last index must at least include a sub-instruction to transmit the operation result to the next processing unit, the N for the first and last indices may be changed to 0. Compared with FIG. 12, in the index list of FIG. 13 there is no index between the first and last. Therefore, two sets of instructions may be generated to form the instruction sequence.

In a first operation 1410 of FIG. 14, compared with the first operation 1310 of FIG. 13, it may be determined that only one non-zero entry exists in $X_2$. That is, the data load module may determine last entries 1411, 1412, 1413, associated with the first value of the validity mask in a predetermined direction as the only entries in each of the entries of the first set to the fourth set $X_1$, $X_2$, $X_3$, $X_4$ . . . . Then, as shown at a second operation 1420 of FIG. 14, the data load module may change the first value of last entries 1411, 1412, 1413 to the second value. The data load module may store the index information of last entries 1411, 1412, 1413 in an index list 1421. Because all entries in $X_4$ are 0, the validity mask is the second value, so there is no last entry with the first value. In this case, unlike FIG. 7, the index associated with the last entry of $X_4$ may be stored as N (No) rather than 0.

Then, using the validity mask changed at the second operation 1420 of FIG. 14, the data load module may generate an index list that includes information about the indices of last entries 1411, 1412, 1413, as shown at a third operation 1430 of FIG. 14. Also, because all other entries have the second value for the validity mask (i.e., they are zero), the data load module may store N for those indices.

Then, as shown at a fourth operation 1440 of FIG. 14, the data load module may determine that from index 1 to index 7, all entries in all of $X_1$, $X_2$, $X_3$, $X_4$ are N, so the instruction set corresponding to indices 1 to 7 is not generated, and the data load module may skip the cycle 1441 corresponding to indices 1 to 7. As shown at a fifth operation 1450 of FIG. 14, the data load module may thereby generate an index list from which the cycle corresponding to indices 1 through 7 is deleted. Then, as shown at a sixth operation 1460 of FIG. 14, the data load module may change N (1461) to 0 in the last index associated with $X_4$ in the index list.

Because the last index is the only index, the instruction corresponding to that index must include at least a sub-instruction to receive a previous operation result and a sub-instruction to transmit the operation result to the next processing unit. Therefore, N (1461) in the last index may be changed to 0. Compared with FIG. 13, there is no first index in the index list of FIG. 14, so only one set of instructions is generated to form the instruction sequence.

The index lists described in FIGS. 12 to 14 may be implemented by using a validity mask. Additionally or alternatively, a separate bit may be assigned for the index list.

The methods described above may be provided as a computer program stored in a computer-readable recording medium, for execution by a computer. The medium may either permanently store a computer-executable program or temporarily store it for execution or download. Also, the medium may be a single piece of hardware or a combination of multiple hardware forming a storage or recording medium, not necessarily a medium directly accessible by a computer; it may be distributed over a network. Examples of such media may include magnetic media such as hard disks, floppy disks, and magnetic tapes; optical media such as CD-ROMs and DVDs; magneto-optical media such as floptical disks; and ROM, RAM, flash memory, or the like, which may be configured to store program instructions. Another example of such media may be an application store or other sites and servers that distribute or supply various software, which are managed as recording or storage media.

The methods, operations, or techniques described in the present disclosure may be implemented in various ways, such as hardware, firmware, software, or combinations thereof. Various example logical blocks, modules, circuits, and algorithm steps described in connection with the present disclosure may be implemented in electronic hardware, computer software, or combinations thereof, as will be understood by those of ordinary skill in the art. To clearly describe the interchangeability of hardware and software, various example configurations, blocks, modules, circuits, and steps have been described generally in terms of their functionality above. Whether such functionality is implemented as hardware or software depends upon the design requirements imposed on the overall system and the particular application. A person of ordinary skill in the art may implement the described functionalities in various ways for each specific application, but such implementations should not be construed as departing from the scope of the present disclosure.

In a hardware implementation, the processing elements (PE) used to implement the techniques may be implemented in one or more ASICs, DSPs, digital signal processing devices (DSPDs), programmable logic devices (PLDs), field-programmable gate arrays (FPGAs), processors, controllers, microcontrollers, microprocessors, electronic devices, or other electronic units designed to perform the functions described in the present disclosure, computers, or combinations thereof.

Thus, various example logical blocks, modules, and circuits described in connection with the present disclosure may be implemented or performed in a general-purpose processor, a DSP, an ASIC, an FPGA, or another programmable logic device, discrete gate or transistor logic, discrete hardware components, or any combination designed to perform the functions described in the present disclosure. A general-purpose processor may be a microprocessor, but, alternatively, the processor may be any conventional processor, controller, microcontroller, or state machine. The processor may also be implemented as a combination of computing devices (e.g., a DSP combined with a microprocessor, multiple microprocessors, one or more microprocessors in conjunction with a DSP core, or any other such configuration).

In a firmware and/or software implementation, the techniques may be implemented as instructions stored in various types of computer-readable media such as RAM, ROM, NVRAM, PROM, EPROM, EEPROM, flash memory, magnetic or marking data storage devices (e.g., hard drives), and the like. These instructions may be executed by one or more processors to perform certain aspects of the present disclosure.

If implemented in software, the functions described may be stored on or transmitted via a computer-readable medium as one or more instructions or code. Computer-readable media may be used to store or transmit a computer program from one place to another, and include both storage media and communication media. Storage media may be any available media that can be accessed by a computer. Non-exhaustive examples of such computer-readable media include RAM, ROM, EEPROM, CD-ROM or other optical disk storage, magnetic disk storage, or other magnetic storage devices, or any other medium used to store or transmit desired program code in the form of instructions or data structures and accessible by a computer. Additionally, any connection may be properly termed a computer-readable medium in the present context.

For example, if software is transmitted from a website, a server, or another remote source using coaxial cable, fiber-optic cable, twisted-pair, digital subscriber line (DSL), or wireless technologies such as infrared, radio, and microwave, then such coaxial cable, fiber-optic cable, twisted-pair, DSL, or wireless technologies such as infrared, radio, and microwave are included within the definition of a medium. As used herein, the term "disk" and "disc" may refer to compact disc (CD), laser disc, optical disc, digital versatile disc (DVD), floppy disk, or Blu-ray disc, where "disks" typically reproduce data magnetically, while "discs" reproduce data optically using lasers. Combinations of these should also be included within the scope of computer-readable media.

Software modules may reside in, for example, RAM memory, flash memory, ROM memory, EPROM memory, EEPROM memory, registers, hard disks, removable disks, CD-ROM, or known types of storage media. Example storage media may be coupled to a processor so that the processor can read information from, and write information to, the storage media. In the alternative, the storage media may be integrated into the processor. An ASIC may reside in a user terminal, with the processor and storage media integrated into the ASIC. Alternatively, the processor and storage media may reside as discrete components in a user terminal.

Accordingly, it should be understood that while some embodiments have been described as being executed on a standalone computer system, the present disclosure is not limited thereto, and it may be implemented in any computing environment, such as a network or distributed computing environment. Furthermore, it may be implemented in multiple processing chips or devices, and storage may likewise be distributed accordingly. Such devices may include PCs, network servers, and portable devices.

It will be apparent to those of ordinary skill in the art that various modifications and changes can be made to the embodiments disclosed herein without departing from the scope of the present disclosure. Also, such modifications and changes should be deemed to be within the scope of the claims appended hereto.

What is claimed is:

1. A data processing device, comprising:
   a storage module configured to store a plurality of entries included in a first matrix and position information associated with each of the plurality of entries, wherein the first matrix includes a plurality of rows and a plurality of columns, and wherein entries included in each of the plurality of rows or each of the plurality of columns among the plurality of entries are grouped into a plurality of sets of entries;
   a data load module configured to receive the plurality of entries and the position information from the storage module, generate a determination result as to whether each of the received plurality of entries is zero, and generate an instruction sequence based on the determination result and the position information, wherein the instruction sequence includes one or more sets of instructions, and wherein the data load module is configured to calculate, in each set of the plurality of sets of entries, a number of entries having a first value indicating that an entry is not zero, and generate a number of sets of instructions equal to a largest number of the calculated number of entries; and
   a processing unit configured to generate an operation result by using a portion of the plurality of entries in accordance with the instruction sequence.

2. The data processing device of claim 1, wherein
   the data load module is further configured to generate, based on the determination result, a validity mask indicating whether each of the received plurality of entries is zero, and
   the validity mask includes the first value indicating each of the plurality of entries that is not zero and a second value indicating each of the plurality of entries that is zero.

3. The data processing device of claim 2, wherein
   the data load module is further configured to determine, based on the generated validity mask, a portion of the received plurality of entries, that is not zero, and wherein the data load module is further configured to generate the instruction sequence by using the determined portion of the plurality of entries and the position information corresponding to the determined portion of entries.

4. The data processing device of claim 2, wherein
   the grouped plurality of sets of entries include entries from a first set of entries through an n-th set of entries, where the n is a natural number greater than or equal to 2,
   each of the sets of entries from the first set through the n-th set is associated with an index that is numbered in a predetermined direction, and entries located in the same row or column position in each of the sets of entries from the first through the n-th set are associated with the same index.

5. The data processing device of claim 4, wherein
   at least a portion of the plurality of instructions included in the instruction sequence are generated in association with the index.

6. The data processing device of claim 4, wherein
   each of the one or more sets of instructions includes n instructions associated with the first set of entries through the n-th set of entries.

7. The data processing device of claim 4, wherein
   the predetermined direction is related to an order of input of the entries to the processing unit among the entries in each of the sets of entries from the first set through the n-th set, and
   the data load module is further configured to:
   determine, in each of the sets of entries from the first set through the n-th set, a last entry in the predetermined direction that is associated with the first value of the validity mask;
   change the first value of the validity mask of the determined entry to the second value in each of the sets of entries from the first set through the n-th set; and
   store an index associated with the determined entry in association with each of the sets of entries from the first set through the n-th set.

8. The data processing device of claim 7, wherein
   after changing the first value of the validity mask of the determined entry to the second value, if it is found that all entries in each of the sets of entries from the first set through the n-th set have the second value, the data load module is further configured to change the validity mask value for the first entry in the predetermined direction to the first value.

9. The data processing device of claim 8, wherein
   after changing the validity mask value for the first entry in the predetermined direction to the first value, the data load module is further configured to:
   identify, in each of the sets of entries from the first set through the n-th set, the first entry in the predetermined direction that is associated with the first value of the validity mask; and
   if the first entry in the predetermined direction that is associated with the first value of the validity mask is not identified in all sets of entries from the first set through the n-th set, generate a first set of instructions that includes an instruction associated with the first entries determined in each of the sets of entries from the first set through the n-th set,
   wherein the generated first set of instructions is included in the instruction sequence.

10. The data processing device of claim 9, wherein
    the operation result is generated through an operation of a systolic array, wherein the systolic array includes a plurality of processing units including the processing unit, and
    each of a plurality of instructions included in the first set of instructions includes a sub-instruction to receive an operation result from a previous processing unit in accordance with an order of operations of the systolic array.

11. The data processing device of claim 9, wherein
    after generating the first set of instructions,
    the data load module is further configured to:
    identify, in each of the sets of entries from the first set through the n-th set, a second entry in the predetermined direction that is associated with the first value of the validity mask; and if at least one set of entries among the sets of entries from the first set through the n-th set has a second entry associated with the first value of the validity mask in the predetermined direction, generate a second set of instructions that includes instructions associated with the identified second entry in each of the sets of entries from the first set through the n-th set, and the generated second set of instructions is included in the instruction sequence as a set of instructions to be executed after the first set of instructions.

12. The data processing device of claim 11, wherein after generating the first set of instructions, if one or more subsequent entries in the predetermined direction in at least one of the sets of entries among the first through the n-th sets of entries all have the second value, the data load module is further configured to generate the second set of instructions including an instruction corresponding to the at least one set of entries that includes a NOP (No operation) instruction.

13. The data processing device of claim 11, wherein after generating the second set of instructions, the data load module is further configured to generate an m-th set of instructions different from the second set of instructions, until there are no further entries associated with the first value of the validity mask in the predetermined direction in each of the sets of entries from the first set through the n-th set, where the m is a natural number greater than or equal to 3, and the m-th set of instructions is stored in the instruction sequence as a set of instructions to be executed after the second set of instructions.

14. The data processing device of claim 11, wherein the data load module is further configured to acquire an index associated with the entries stored in association with each of the sets of entries from the first set through the n-th set, and generate a last set of instructions that includes instructions associated with the acquired index, and the generated last set of instructions is stored in the instruction sequence as a set of instructions executed last.

15. The data processing device of claim 14, wherein a plurality of processing units including the processing unit are arranged in an order of operations according to a systolic array structure, and each of a plurality of instructions included in the last set of instructions includes a sub-instruction to transmit the operation result from the processing unit to a next processing unit in the order of operations of the systolic array.

16. The data processing device of claim 11, wherein the data load module is further configured to acquire an index associated with the entries that is stored in association with each of the sets of entries from the first set through the n-th set, and if, in all of the sets of entries from the first set through the n-th set, a first entry associated with the first value of the validity mask in the predetermined direction is identified, and second entry associated with the first value of the validity mask in the predetermined direction is not identified in any of the sets of entries from the first set through the n-th set, the data load module is further configured to generate a set of instructions that includes an instruction associated with the acquired index, the generated set of instructions is stored in the instruction sequence as an only set of instructions.

17. The data processing device of claim 16, wherein the operation result is generated through an operation of a systolic array, which includes a plurality of processing units including the processing unit, and the plurality of processing units are arranged in an order of operations according to the systolic array structure, each of a plurality of instructions included in the set of instructions includes a sub-instruction to receive an operation result from a previous processing unit in accordance with the order of operations of the systolic array, and each of a plurality of instructions included in the last set of instructions includes a sub-instruction to transmit an operation result generated by the processing unit, using the operation result received from the previous processing unit, to a next processing unit of the processing unit.

18. The data processing device of claim 1, wherein the operation result is generated through a multiplication operation between the first matrix and a second matrix, the plurality of entries included in the first matrix include values representing activations of an artificial neural network, the plurality of entries included in the second matrix include values representing weights of the artificial neural network, and at least a portion of the plurality of entries included in the second matrix are pre-loaded and stored in the processing unit.

19. The data processing device of claim 18, wherein a plurality of processing units including the processing unit are arranged in an order of operations according to a systolic array structure, the first matrix is extended by using a third matrix having a same size as either the same row or the same column of the first matrix, the second matrix is extended by using a fourth matrix having a same size as either the same row or the same column of the second matrix, a previous processing unit of the processing unit is associated with the third matrix or the fourth matrix extended in either a left or an upper direction from each of the first and second matrices, and in accordance with the order of operations in the systolic array, a next processing unit of the processing unit is associated with the third matrix or the fourth matrix extended in either a right or a lower direction from each of the first and second matrices.

20. The data processing device of claim 1, wherein a number of sub-instructions for at least one of an operation or communication included in each of the plurality of instructions in the instruction sequence, executed by the processing unit, is identical to a number of rows or a number of columns of the first matrix.

* * * * *